US011356180B2

(12) United States Patent
McNicol et al.

(10) Patent No.: US 11,356,180 B2
(45) Date of Patent: Jun. 7, 2022

(54) HUB-LEAF LASER SYNCHRONIZATION

(71) Applicant: Infinera Corporation, Sunnyvale, CA (US)

(72) Inventors: John D. McNicol, Ottawa (CA); Han Henry Sun, Ottawa (CA); Kuang-Tsan Wu, Ottawa (CA)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 16/871,078

(22) Filed: May 11, 2020

(65) Prior Publication Data

US 2021/0111803 A1 Apr. 15, 2021

Related U.S. Application Data

(60) Provisional application No. 62/913,484, filed on Oct. 10, 2019.

(51) Int. Cl.
*H04B 10/50* (2013.01)
*H04B 10/61* (2013.01)
(Continued)

(52) U.S. Cl.
CPC ......... *H04B 10/503* (2013.01); *H04B 10/504* (2013.01); *H04B 10/524* (2013.01);
(Continued)

(58) Field of Classification Search
None
See application file for complete search history.

(56) References Cited

U.S. PATENT DOCUMENTS 4,483,000 A 11/1984 Yamamoto et al.
4,528,565 A 7/1985 Hauptmann
(Continued)

FOREIGN PATENT DOCUMENTS

EP 0512642 11/1992
EP 3208957 8/2017
(Continued)

OTHER PUBLICATIONS

J. Leuthold et al., "Super Channels Based on Nyquist Multiplexing," 2012 17th Opto-Electronics and Communications Conference (OECC 2012) Technical Digest, Jul. 2012, Busan, Kor.
(Continued)

*Primary Examiner* — Darren E Wolf
(74) *Attorney, Agent, or Firm* — David L. Soltz

(57) ABSTRACT

Consistent with the present disclosure a network is provided that includes a primary node and a plurality of secondary nodes. The primary node, as well as each of the secondary nodes, includes a laser that is "shared" between the transmit and receive sections. That is, light output from the laser is used for transmission as well as for coherent detection. In the coherent receiver, the frequency of the primary node laser is detected and, based on such detected frequency, the frequency of the secondary node laser is adjusted to detect the received information or data. Such frequency detection also serves to adjust the transmitted signal frequency, because the laser is shared between the transmit and receive portions in each secondary receiver. Light output from the primary node laser, which is also shared between transmit and receive portions in the primary node, is thus also set to a frequency that permits detection of each of the incoming optical signals by way of coherent detection. Since, in this example, only one laser is employed in the primary node, the primary node may have a simpler design and may be less
(Continued)

expensive to manufacture compared to a primary node having multiple local oscillator lasers, each associated with a corresponding uplink optical signal.

19 Claims, 24 Drawing Sheets

(51) Int. Cl.
 *H04B 10/40* (2013.01)
 *H04B 10/532* (2013.01)
 *H04B 10/524* (2013.01)
(52) U.S. Cl.
 CPC ......... *H04B 10/532* (2013.01); *H04B 10/614* (2013.01); *H04B 10/40* (2013.01)

(56) References Cited

U.S. PATENT DOCUMENTS

| | | |
|---|---|---|
| 5,153,762 A | 10/1992 | Huber |
| 5,208,692 A | 5/1993 | McMahon |
| 5,596,436 A | 1/1997 | Sargis |
| 5,822,094 A | 10/1998 | O'Sullivan |
| 5,825,857 A | 10/1998 | Reto |
| 6,046,838 A | 4/2000 | Kou |
| 6,362,913 B2 | 3/2002 | Ooi et al. |
| 6,525,857 B1 | 2/2003 | Way |
| 6,563,880 B1 | 5/2003 | Hunsinger et al. |
| 6,580,544 B1 | 6/2003 | Lin et al. |
| 6,687,044 B2 | 2/2004 | Paquet |
| 7,209,664 B1* | 4/2007 | McNicol ............... H04B 10/50 375/219 |
| 7,266,306 B1 | 9/2007 | Harley et al. |
| 7,466,919 B1 | 2/2008 | Birk et al. |
| 7,346,284 B2 | 3/2008 | Wan |
| 7,376,358 B2 | 5/2008 | Roberts et al. |
| 7,447,436 B2 | 11/2008 | Yee |
| 7,522,842 B1* | 4/2009 | McNicol ............ H04B 10/2916 398/157 |
| 7,701,842 B2 | 4/2010 | Roberts et al. |
| 7,715,710 B2 | 5/2010 | Wan |
| 7,729,621 B2 | 6/2010 | Nahapetian et al. |
| 7,756,421 B2 | 7/2010 | Roberts |
| 7,826,752 B1 | 11/2010 | Zanoni |
| 8,184,992 B2 | 5/2012 | Kikuchi |
| 8,203,777 B2 | 6/2012 | Smith et al. |
| 8,412,047 B2 | 4/2013 | Tanaka |
| 8,437,645 B2 | 5/2013 | Boffi et al. |
| 8,472,810 B2 | 6/2013 | Akiyama |
| 8,477,056 B2 | 7/2013 | Sun et al. |
| 8,477,656 B2 | 7/2013 | O'Mahony |
| 8,478,137 B2 | 7/2013 | Komaki et al. |
| 8,655,190 B2 | 2/2014 | Wu et al. |
| 8,682,180 B1 | 3/2014 | Nimon et al. |
| 8,730,079 B2 | 5/2014 | Tudose |
| 8,768,177 B2 | 7/2014 | Wu et al. |
| 8,861,977 B2 | 10/2014 | McNicol |
| 8,929,750 B2 | 1/2015 | Ishihara |
| 8,965,203 B1 | 2/2015 | Vahdat |
| 8,971,723 B2 | 3/2015 | Le Taillandier De Gabory |
| 8,989,593 B2 | 3/2015 | Sun et al. |
| 9,020,363 B2 | 4/2015 | Yasuda |
| 9,048,957 B2 | 6/2015 | Nakashima |
| 9,112,609 B2 | 8/2015 | Kim et al. |
| 9,154,231 B2 | 10/2015 | Kaneda |
| 9,166,692 B1 | 10/2015 | Felderman |
| 9,197,320 B2 | 11/2015 | Vassilieva |
| 9,244,928 B1 | 1/2016 | Nishimoto |
| 9,270,379 B2 | 2/2016 | Huang et al. |
| 9,281,915 B2 | 3/2016 | Kaneda |
| 9,363,585 B2 | 6/2016 | Carpini |
| 9,419,720 B2 | 8/2016 | Akiyama |
| 9,461,749 B2 | 10/2016 | Jansen et al. |
| 9,485,554 B1 | 11/2016 | Kim |
| 9,553,675 B2 | 1/2017 | Karar et al. |
| 9,608,866 B2 | 3/2017 | Rajan |
| 9,673,907 B1 | 6/2017 | Vassilieva |
| 9,686,020 B2 | 6/2017 | Mochizuki et al. |
| 9,705,592 B1 | 7/2017 | Schmogrow |
| 9,735,881 B1 | 8/2017 | Agazzi et al. |
| 9,991,953 B1 | 6/2018 | Fludger |
| 10,014,975 B2 | 7/2018 | Krause et al. |
| 10,027,424 B2 | 7/2018 | Zhuge et al. |
| 10,243,653 B2 | 3/2019 | Wiswell |
| 10,243,688 B2 | 3/2019 | Vassilieva |
| 10,348,410 B1 | 7/2019 | Charlton |
| 10,374,623 B1 | 8/2019 | Oveis Gharan |
| 10,374,721 B2 | 8/2019 | Awdalla |
| 10,389,447 B1 | 8/2019 | Khandani |
| 10,397,190 B2 | 8/2019 | Akhavain Mohammadi |
| 10,491,302 B1 | 11/2019 | Morris |
| 10,523,315 B2 | 12/2019 | Jiang |
| 10,547,388 B2 | 1/2020 | Ikeda |
| 10,574,362 B2 | 2/2020 | Chen |
| 10,587,358 B1 | 3/2020 | Ebrahimzad |
| 2002/0003641 A1 | 1/2002 | Hall |
| 2002/0005971 A1 | 1/2002 | Sasai |
| 2002/0034194 A1 | 3/2002 | Shattil |
| 2002/0067883 A1 | 6/2002 | Lo |
| 2002/0114038 A1 | 8/2002 | Arnon |
| 2002/0122518 A1 | 9/2002 | Yasuda et al. |
| 2002/0145783 A1 | 10/2002 | Chang |
| 2002/0181062 A1* | 12/2002 | Graves ................ H04B 10/506 398/182 |
| 2003/0020995 A1 | 1/2003 | Harasawa |
| 2003/0223751 A1 | 12/2003 | Shimizu |
| 2004/0016874 A1 | 1/2004 | Rao |
| 2004/0019459 A1 | 1/2004 | Dietz |
| 2004/0032643 A1 | 2/2004 | Chimfwembe |
| 2004/0033074 A1 | 2/2004 | Hsu |
| 2004/0105682 A1 | 6/2004 | Roberts |
| 2004/0114939 A1* | 6/2004 | Taylor .................... H04B 10/64 398/152 |
| 2004/0197103 A1 | 7/2004 | Roberts |
| 2004/0151109 A1 | 8/2004 | Batra |
| 2004/0198265 A1 | 10/2004 | Wallace |
| 2004/0208614 A1 | 10/2004 | Price |
| 2004/0252996 A1 | 12/2004 | McNicol |
| 2005/0008085 A1 | 1/2005 | Lee |
| 2005/0074037 A1 | 4/2005 | Rickard |
| 2005/0111789 A1 | 5/2005 | Hayes |
| 2005/0147415 A1 | 7/2005 | Fee |
| 2005/0169585 A1 | 8/2005 | Aronson |
| 2005/0175112 A1 | 8/2005 | Pisani |
| 2005/0175339 A1 | 8/2005 | Herskowits |
| 2005/0238087 A1* | 10/2005 | Yang ..................... H04B 1/7087 375/219 |
| 2006/0078336 A1 | 4/2006 | McNicol et al. |
| 2006/0093052 A1 | 5/2006 | Cho |
| 2006/0159454 A1 | 7/2006 | Bjornstad |
| 2006/0215540 A1 | 9/2006 | Krishnamoorthi |
| 2006/0233147 A1 | 10/2006 | Karabinis |
| 2006/0269295 A1 | 11/2006 | Way |
| 2006/0280510 A1 | 12/2006 | Onaka |
| 2007/0004465 A1 | 1/2007 | Papasakellariou |
| 2007/0025421 A1 | 2/2007 | Shattil |
| 2007/0092263 A1 | 4/2007 | Agazzi |
| 2008/0063409 A1 | 3/2008 | Toliver |
| 2008/0085125 A1 | 4/2008 | Frankel |
| 2008/0152361 A1* | 6/2008 | Chen .................. H04B 10/6164 398/205 |
| 2008/0232816 A1 | 9/2008 | Hoshida |
| 2008/0267630 A1 | 10/2008 | Qian |
| 2009/0110033 A1 | 4/2009 | Shattil |
| 2009/0129497 A1* | 5/2009 | Stopler ............... H04L 25/0238 375/267 |
| 2009/0154336 A1 | 6/2009 | Green |
| 2009/0190929 A1 | 7/2009 | Khurgin |
| 2009/0196603 A1 | 8/2009 | Zhou |
| 2009/0214224 A1 | 8/2009 | Cho |
| 2009/0232234 A1 | 9/2009 | Du |
| 2009/0238578 A1 | 9/2009 | Taylor |
| 2009/0238580 A1 | 9/2009 | Kikuchi |

(56) References Cited

U.S. PATENT DOCUMENTS

| | | |
|---|---|---|
| 2009/0257344 A1 | 10/2009 | Huang |
| 2009/0257755 A1 | 10/2009 | Buelow |
| 2009/0092389 A1 | 11/2009 | Wei |
| 2010/0021163 A1 | 1/2010 | Shieh |
| 2010/0021166 A1 | 1/2010 | Way |
| 2010/0028002 A1 | 2/2010 | Qian |
| 2010/0086303 A1 | 4/2010 | Qian |
| 2010/0142964 A1 | 6/2010 | Chang et al. |
| 2010/0142967 A1 | 6/2010 | Perez |
| 2010/0178057 A1 | 7/2010 | Shieh |
| 2010/0189445 A1 | 7/2010 | Nakashima |
| 2010/0209121 A1* | 8/2010 | Tanimura ............... H04J 14/06 398/202 |
| 2010/0215368 A1 | 8/2010 | Qian |
| 2010/0246581 A1 | 9/2010 | Henry |
| 2010/0254707 A1 | 10/2010 | Peng |
| 2010/0329671 A1 | 12/2010 | Essiambre |
| 2010/0329683 A1 | 12/2010 | Liu |
| 2011/0097085 A1* | 4/2011 | Oda ..................... H04B 10/516 398/65 |
| 2011/0097092 A1 | 4/2011 | Wagner et al. |
| 2011/0135301 A1 | 6/2011 | Myslinski |
| 2011/0142450 A1 | 6/2011 | Tanzi et al. |
| 2011/0150475 A1* | 6/2011 | Soto .................. H04B 10/2589 398/63 |
| 2011/0176813 A1 | 7/2011 | Kim |
| 2011/0182577 A1 | 7/2011 | Wu |
| 2011/0249978 A1 | 10/2011 | Sasaki |
| 2011/0255870 A1 | 10/2011 | Grigoryan |
| 2012/0002703 A1 | 1/2012 | Yamashita |
| 2012/0033965 A1 | 2/2012 | Zhang |
| 2012/0045209 A1 | 2/2012 | Boyd |
| 2012/0069854 A1* | 3/2012 | Suzuki .................. H04B 10/65 370/465 |
| 2012/0082466 A1 | 4/2012 | Wu |
| 2012/0093510 A1 | 4/2012 | Zhang |
| 2012/0099864 A1 | 4/2012 | Ishihara |
| 2012/0141130 A1 | 6/2012 | Nakashima |
| 2012/0141135 A1 | 6/2012 | Yang |
| 2012/0148264 A1 | 6/2012 | Liu |
| 2012/0213532 A1* | 8/2012 | Hironishi ........... H04B 10/6165 398/208 |
| 2012/0219285 A1 | 8/2012 | Dahan |
| 2012/0251119 A1 | 10/2012 | McNicol |
| 2012/0251121 A1 | 10/2012 | McNicol |
| 2012/0263456 A1* | 10/2012 | Tanaka ............... H04B 10/5055 398/25 |
| 2012/0263471 A1 | 10/2012 | Buchali |
| 2012/0269510 A1 | 10/2012 | Hui |
| 2012/0269515 A1 | 10/2012 | Cvijetic |
| 2012/0288286 A1* | 11/2012 | Houtsma ............. H04B 10/613 398/202 |
| 2013/0070785 A1 | 3/2013 | Liu |
| 2013/0070786 A1 | 3/2013 | Liu |
| 2013/0101296 A1 | 4/2013 | Nishimoto |
| 2013/0108271 A1 | 5/2013 | Tang et al. |
| 2013/0136449 A1 | 5/2013 | Liu |
| 2013/0170834 A1 | 7/2013 | Cho et al. |
| 2013/0191877 A1 | 7/2013 | Rakib |
| 2013/0195452 A1 | 8/2013 | Hui |
| 2013/0202303 A1 | 8/2013 | Wilkinson |
| 2013/0251364 A1 | 9/2013 | Pachnicke |
| 2013/0286847 A1 | 10/2013 | Schmidt |
| 2014/0010543 A1 | 1/2014 | Lee |
| 2014/0056371 A1 | 2/2014 | Ji |
| 2014/0072303 A1 | 3/2014 | Pfau |
| 2014/0079390 A1 | 3/2014 | Kim |
| 2014/0079391 A1 | 3/2014 | Kim |
| 2014/0092924 A1 | 4/2014 | Krause et al. |
| 2014/0099116 A1 | 4/2014 | Bai |
| 2014/0126916 A1 | 5/2014 | Ota |
| 2014/0153925 A1 | 6/2014 | Nishihara et al. |
| 2014/0205286 A1 | 7/2014 | Ji et al. |
| 2014/0233963 A1 | 8/2014 | Le Taillandier De Gabory |
| 2014/0241727 A1 | 8/2014 | Lim et al. |
| 2014/0270759 A1 | 9/2014 | Djordjevic |
| 2014/0270761 A1 | 9/2014 | Xu |
| 2014/0270803 A1 | 9/2014 | Olsson |
| 2014/0294381 A1 | 10/2014 | McNicol |
| 2014/0314411 A1 | 10/2014 | Huang |
| 2014/0314416 A1 | 10/2014 | Vassilieva |
| 2014/0341587 A1 | 11/2014 | Nakashima |
| 2014/0363164 A1 | 12/2014 | Kim |
| 2014/0376930 A1 | 12/2014 | Shiba |
| 2015/0063808 A1 | 3/2015 | Xia |
| 2015/0071642 A1 | 3/2015 | Tanaka |
| 2015/0071652 A1* | 3/2015 | Zhuge ................. H04B 10/697 398/158 |
| 2015/0093118 A1 | 4/2015 | Jia |
| 2015/0098700 A1 | 4/2015 | Zhu |
| 2015/0117860 A1 | 4/2015 | Braun |
| 2015/0125160 A1 | 5/2015 | Wen |
| 2015/0188637 A1 | 7/2015 | Tanimura |
| 2015/0188642 A1 | 7/2015 | Sun |
| 2015/0229332 A1 | 8/2015 | Yuan |
| 2015/0229401 A1 | 8/2015 | Tanaka |
| 2015/0280853 A1 | 10/2015 | Sun |
| 2015/0288456 A1 | 10/2015 | Zhu |
| 2015/0289035 A1 | 10/2015 | Mehrvar |
| 2015/0296278 A1 | 10/2015 | Liu |
| 2015/0318952 A1* | 11/2015 | Butrie ................... H04B 10/40 398/65 |
| 2015/0333860 A1 | 11/2015 | Rahn |
| 2016/0013881 A1 | 1/2016 | Rejaly et al. |
| 2016/0029403 A1 | 1/2016 | Roy et al. |
| 2016/0050021 A1 | 2/2016 | Hua |
| 2016/0057516 A1 | 2/2016 | Hochberg |
| 2016/0094292 A1 | 3/2016 | Mochizuki |
| 2016/0099777 A1 | 4/2016 | Liu |
| 2016/0112141 A1 | 4/2016 | Rahn |
| 2016/0142150 A1 | 5/2016 | Lyubomirsky |
| 2016/0191168 A1 | 6/2016 | Huang |
| 2016/0192042 A1 | 6/2016 | Mitchell |
| 2016/0197681 A1 | 7/2016 | Sun |
| 2016/0218812 A1 | 7/2016 | Okabe |
| 2016/0233963 A1 | 8/2016 | Zhuge et al. |
| 2016/0261347 A1 | 9/2016 | Karar |
| 2016/0277816 A1 | 9/2016 | Yuang |
| 2016/0316281 A1 | 10/2016 | Keyworth |
| 2016/0323039 A1* | 11/2016 | Sun ..................... H04J 14/026 |
| 2017/0005747 A1 | 1/2017 | Kim |
| 2017/0019168 A1 | 1/2017 | Menard |
| 2017/0033864 A1 | 2/2017 | Nagarajan |
| 2017/0033999 A1 | 2/2017 | Nagarajan |
| 2017/0041077 A1* | 2/2017 | Yu ....................... H04B 10/614 |
| 2017/0041691 A1 | 2/2017 | Rickman |
| 2017/0054513 A1 | 2/2017 | Guo |
| 2017/0070313 A1 | 3/2017 | Kato |
| 2017/0078028 A1 | 3/2017 | Zhang |
| 2017/0078044 A1 | 3/2017 | Hino |
| 2017/0104535 A1 | 4/2017 | Hoshida |
| 2017/0134836 A1 | 5/2017 | Sindhy |
| 2017/0149507 A1 | 5/2017 | Le Taillandier De Gabory |
| 2017/0163347 A1 | 6/2017 | Akiyama |
| 2017/0222716 A1 | 8/2017 | Nakashima |
| 2017/0237500 A1 | 8/2017 | Nishimoto |
| 2017/0250775 A1 | 8/2017 | Kato |
| 2017/0324480 A1 | 11/2017 | Elmirghani |
| 2017/0366267 A1 | 12/2017 | Campos |
| 2017/0367061 A1 | 12/2017 | Kim |
| 2018/0034555 A1 | 2/2018 | Goh |
| 2018/0115407 A1 | 4/2018 | Melikyan |
| 2018/0120520 A1 | 5/2018 | Kelly |
| 2018/0145761 A1 | 5/2018 | Zhuge |
| 2018/0198547 A1 | 7/2018 | Mehrvar |
| 2018/0219632 A1 | 8/2018 | Yoshida |
| 2018/0234285 A1 | 8/2018 | Djordjevic |
| 2018/0241476 A1 | 8/2018 | Johnson |
| 2018/0278331 A1 | 9/2018 | Cao |
| 2018/0324717 A1 | 11/2018 | Zhou |
| 2018/0359047 A1 | 12/2018 | Vassilieva |
| 2019/0020409 A1 | 1/2019 | Le Taillandier De Gabory |
| 2019/0097728 A1 | 3/2019 | Frankel |

(56) References Cited

U.S. PATENT DOCUMENTS

| | | |
|---|---|---|
| 2019/0123819 A1 | 4/2019 | Jiang |
| 2019/0149242 A1 | 5/2019 | Torbatian |
| 2019/0149389 A1 | 5/2019 | Torbatian |
| 2019/0253153 A1 | 8/2019 | Sun |
| 2019/0260493 A1 | 8/2019 | Chimfwembe |
| 2019/0288777 A1 | 9/2019 | Ishimura |
| 2019/0312640 A1 | 10/2019 | Binkai |
| 2020/0076508 A1 | 3/2020 | Jia |
| 2020/0177525 A1 | 6/2020 | Morris |

FOREIGN PATENT DOCUMENTS

| | | |
|---|---|---|
| WO | WO 2012100714 | 8/2012 |
| WO | WO 2014114332 | 7/2014 |

OTHER PUBLICATIONS

S. Watanabe et al., "Optical Coherent Broad-Band Transmission for Long-Haul and Distribution Systems Using Subcarrier Multiplexing," Journal of Lightwave Technology, vol. 11, No. 1, Jan. 1993, pp. 116-127.

M. Jinno et al., "Demonstration of Novel Spectrum-Efficient Elastic Optical Path Network with Per-Channel Variable Capacity of 40 Gb/s to Over 400 Gb/s," ECOC 2008, Sep. 21-25, 2008, Brussels, Belgium, Th.3.F.6.

Y. Chen et al., "Experimental Demonstration of Roadm Functionality on an Optical Scfdm Superchannel," IEEE Photonics Technology Letters, vol. 24, No. 3, Feb. 1, 2012, pp. 215-217.

Adaptive Software Defined Terabit Transceiver For Flexible Optical Networks, Public executive summary of the Final Project Periodic Report, Jun. 16, 2016.

Hillerkus, Single-Laser Multi-Terabit/s Systems, KIT Scientific Publishing, 2013, Chapters 1, 3, and 6.

Hu et al., "Flexible and Concurrent All-Optical VPN in OFDMA PON," IEEE Photonics Technology Journal, vol. 5, No. 6, Dec. 2013.

Bosco et al., "On the Performance of Nyquist-WDM Terabit Superchannels Based on PM-BPSK, PM-QPSK, PM-8QAM or PM-16QAM Subcarriers," Journal of Lightwave Technology, vol. 29, No. 1, Jan. 1, 2011, pp. 53-60.

K. Roberts et al., "Flexible Transceivers," ECOC Technical Digest, 2012, We.3.A.3.

K. Roberts et al., "High Capacity Transport—100G and Beyond," Journal of Lightwave Technology, vol. 33, No. 3, Feb. 1, 2015, pp. 563-578.

J. Reis et al., "Performance Optimization of Nyquist Signaling for Spectrally Efficient Optical Access Networks [Invited]," J. Opt. Commun. Netw./vol. 7, No. 2, Feb. 2015, pp. A200-A208.

R. Ferreira et al, Coherent Nyquist UDWDM-PON With Digital Signal Processing in Real Time, Journal of Lightwave Technology, vol. 34, No. 2, Jan. 15, 2016, pp. 826-833.

A. Shahpari et al., "Coherent Access: A Review", Journal of Lightwave Technology, vol. 35, No. 4, Feb. 15, 2017, pp. 1050-1058.

P. Layec et al., "Rate-Adaptable Optical Transmission and Elastic Optical Networks," Chapter 15, Enabling Technologies for High Spectral-efficiency Coherent Optical Communication Networks, First Edition, 2016 John Wiley & Sons, Inc. Published 2016, pp. 507-545.

J. Altabas, "Cost-effective Transceiver based on a RSOA and a VCSEL for Flexible uDWDM Networks," IEEE Photonics Technology Letters ( vol. 28 , Issue: 10, May 15, 15, 2016, pp. 1111-1114.

K. Roberts et al., "Beyond 100 Gb/s: Capacity, Flexibility, and Network Optimization," J. Opt. Commun. Netw./vol. 9, No. 4/Apr. 2017, pp. C12-C24.

Lavery et al., "Digital Coherent Receivers for Long-Reach Optical Access Networks," Journal of Lightwave Technology, vol. 31, No. 4, Feb. 15, 2013, pp. 609-620.

V. Vujicic, "Optical Multicarrier Sources for Spectrally Efficient Optical Networks," A Dissertation submitted in fulfilment of the requirements for the award of Doctor of Philosophy (Ph.D.) to the Dublin City University, Dec. 2015, Chapters 1, 2, and 6.

Straullu et al., "Single-Wavelength Downstream FDMA-PON at 32 Gbps and 34 dB ODN Loss," IEEE Photonics Technology Letters, vol. 27, No. 7, Apr. 1, 2015, pp. 774-777.

Y. Zhang et al., "Digital subcarrier multiplexing for flexible spectral allocation in optical transport network," Oct. 24, 2011 / vol. 19, No. 22 / Optics Express 21882.

R. Schmogrow et al., "Nyquist Frequency Division Multiplexing for Optical Communications," CLEO Technical Digest, OSA 2012, CTh1H.2.

P Khodashenas. "Investigation of Spectrum Granularity for Performance Optimization of Flexible Nyquist-WDM-Based Optical Networks." Journal of Lightwave Technology, vol. 33, No. 23, Dec. 1, 2015 pp. 4767-4774.

Mishra et al., "Flexible RF-Based Comb Generator," IEEE Photonics Technology Letters, vol. 25, No. 7, Apr. 1, 2013, pp. 701-704.

M. Jinno et al., "Multiflow Optical Transponder for Efficient Multilayer Optical Networking," IEEE Communications Magazine • May 2012, pp. 56-65.

Kim Roberts, "100G and Beyond," OFC 2014, OSA 2014, Tu3J.1.

J. Fischer, "Digital signal processing for coherent UDWDM passive optical networks," ITG-Fachbericht 248: Photonische Netze 05.—06.05.2014 in Leipzig, VDE VERLAG GMBH • Berlin • Offenbach, Germany, ISBN 978-3-8007-3604-1.

Kottke et al., "Coherent UDWDM PON with joint subcarrier reception at OLT," Optics Express, Jul. 2, 2014.

Lavery et al., "Reduced Complexity Equalization for Coherent Long-Reach Passive Optical Networks," J. Opt. Commun. Netw./vol. 7, No. 1/Jan. 2015, pp. A16-A27.

Lazaro et al., "Flexible PON Key Technologies: Digital Advanced Modulation Formats and Devices," 2014 16th International Conference on Transparent Optical Networks (ICTON), Tu.B3.2.

Optical Internetworking Forum—Technology Options for 400G Implementation OIF-Tech-Options-400G-01.0, Jul. 2015.

Riccardi et al., "Sliceable bandwidth variable transponder: the IDEALIST vision," 2015 European Conference on Networks and Communications (EuCNC), pp. 330-334.

Sambo et al., "Next Generation Sliceable Bandwidth Variable Transponders," IEEE Communications Magazine, Feb. 2015, pp. 163-171.

P. Schindler et al., "Colorless FDMA-PON With Flexible Bandwidth Allocation and Colorless, Low-Speed ONUs [Invited]," J. Opt. Commun. Netw./vol. 5, No. 10/Oct. 2013, pp. A204-A212.

Schmogrow et al., "Real-time Nyquist signaling with dynamic precision and flexible non-integer oversampling," Jan. 13, 2014 | vol. 22, No. 1 | DOI:10.1364/OE.22.000193 | Optics Express 193.

Schmogrow et al., "Real-Time Digital Nyquist-WDM and OFDM Signal Generation: Spectral Efficiency Versus DSP Complexity," ECOC Technical Digest, 2012 OSA, Mo.2.A.4.

Boutaba et al., "Elastic Optical Networking for 5G Transport," J Netw Syst Manage (2017) 25m pp. 819-847 123.

S. Smolorz et al., "Demonstration of a Coherent UDWDM-PON with Real-Time Processing," OFC/NFOEC 2011, PDPD4.

H. Rohde et al. "Coherent Ultra Dense WDM Technology for Next Generation Optical Metro and Access Networks," Journal of Lightwave Technology, vol. 32, No. 10, May 15, 2014 pp. 2041-2052.

Ze Dong et al., "Very-High-Throughput Coherent Ultradense WDM-PON Based on Nyquist-ISB Modulation," IEEE Photonics Technology Letters, vol. 27, No. 7, Apr. 1, 2015, pp. 763-766.

Rohde et al., "Digital Multi-Wavelength Generation and Real Time Video Transmission in a Coherent Ultra Dense WDM PON," OFC/NFOEC Technical Digest, 2013 OSA, OM3H.3.

International Search Report issued in connection with PCT/US2020/023871 dated Sep. 24, 2020.

Guo-Wei Lu et al., "Optical subcarrier processing for Nyquist SCM signals via coherent spectrum overlapping in four-wave mixing with coherent multi-tone pump", Optics Express, vol. 26, No. 2, Jan. 22, 2018.

International Search Report issued in connection with PCT/US2020/018180 dated Sep. 18, 2020.

(56) References Cited

OTHER PUBLICATIONS

International Search Report issued in connection with PCT/US2020/036209 dated Oct. 1, 2020.
International Search Report issued in connection with PCT/US2020/018292 dated Jun. 4, 2020.
International Search Report issued in connection with PCT/US2020/021024 dated Aug. 3, 2020.
Wei et al: Mac Protocols for Optical Orthogonal Frequency Division Multiple Access (OFDMA)-based Passive Optical Networks, OFC/NFOEC 2008, paper JWA82, Feb. 24-28, 2008 (Year: 2008).
Cerisola et al., "Subcarrier multiplex of packet headers in a WDM optical network and a nouvel ultrafast header clock-recovery technique", 1995, OFC '95 Technical Digest, pp. 273-274 (Year: 1995).
Michael G. Taylor, "Coherent Detection Method Using DSP for Demodulation of Signal and Subsequent Equalization of Propagation Impairments," IEEE Photonics Technology Letters, vol. 16, No. 2, Feb. 2004, pp. 674-676.
K. Roberts, et al., "Performance of dual-polarization QPSK for optical transport system, "JLT, vol. 27, No. 16, pp. 3546-3559, Aug. 2009.
S.J. Savory et al., "Digital equalisation of 40Gbit/s per wavelength transmission over 2480km of standard fibre without optical dispersion compensation," European Conference on Optical Communications (ECOC) 2006, paper Th2.5.5.
H. Sun et al., "Real-time measurements of a 40 Gb/S coherent system," Jan. 21, 2008, vol. 16, No. 2, Optics Express, pp. 873-879.
Greshishchev et al., "A 56GS/s 6b DAC in 65nm CMOS with 256×6b Memory", ISSCC 2011/Session 1 0/Nyquist-Rate Converters/1 0.8, 2011 IEEE International Solid-State Circuits Conference, 3 pages.
Bingham, "Multicarrier Modulator for Data Transmission: An Idea Whose Time Has Come", IEEE Communications Magazine, pp. 5-14, May 1990, 8 pages.
Yan et al. "Experimental Comparison of No-Guard-Interval-OFDM and Nyquist-WDM Superchannels", OFC/NFOEC Techincal Digest, Jan. 23, 20212, 4 pages.
Zhuge et al., "Comparison of Intra-Channel Nonlinearity Tolerance Between Reduced-Guard-Interval CO-OFDM Systems and Nyquist Single Carrier Systems", OFC/NFOEC Technical Digest, Jan. 23, 2012, 4 pages.
Zhang et al., "3760km, 100G SSMF Transmission over Commercial Terrestrial DWDM ROADM Systems using SD-FEC", OFC/NFOEC Postdeadline Papers, Mar. 2012, 3 pages.
Rahn et al., "250Gb/s Real-Time PIC-based Super-Channel Transmission Over a Gridless 6000km Terrestrial Link", OFC/NFOEC Posteadline Papers, Mar. 2012,3 pages.

\* cited by examiner

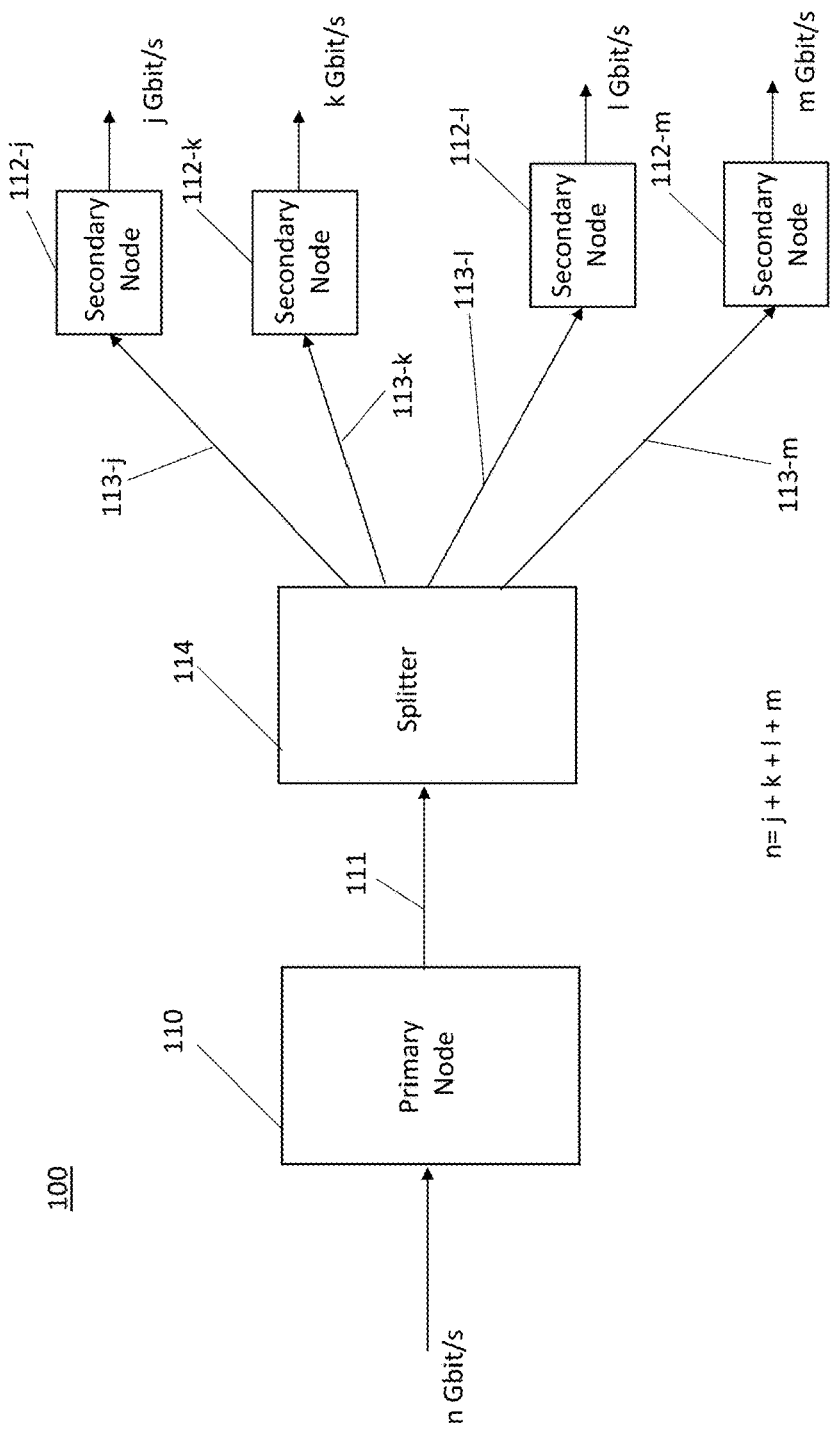

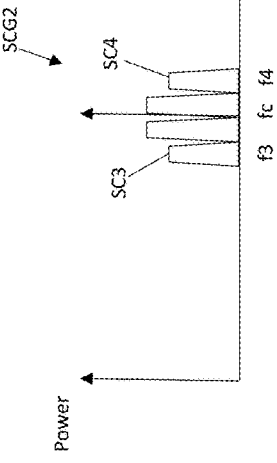
Fig. 15e
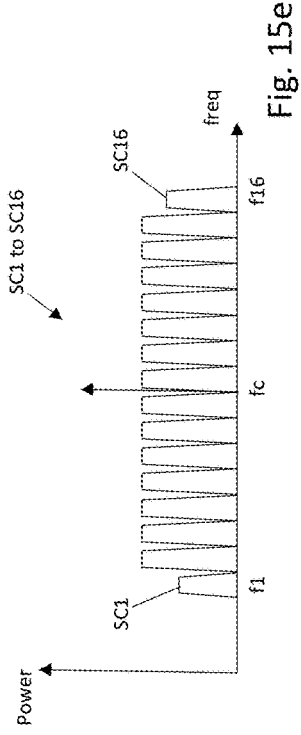
Fig. 15f
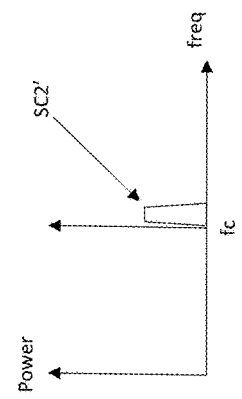
Fig. 15i
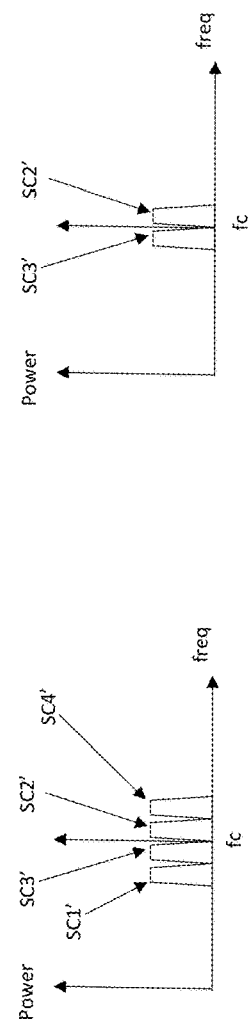
Fig. 15g
Fig. 15h

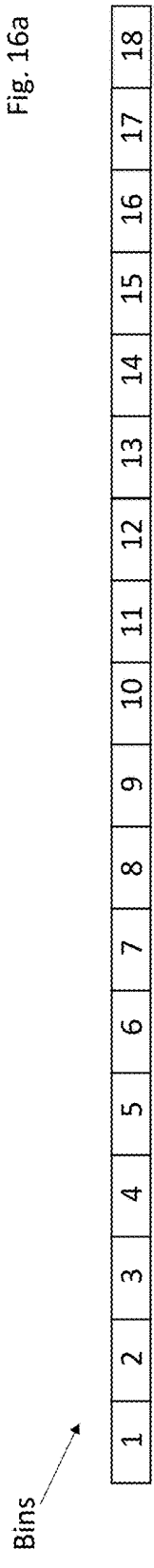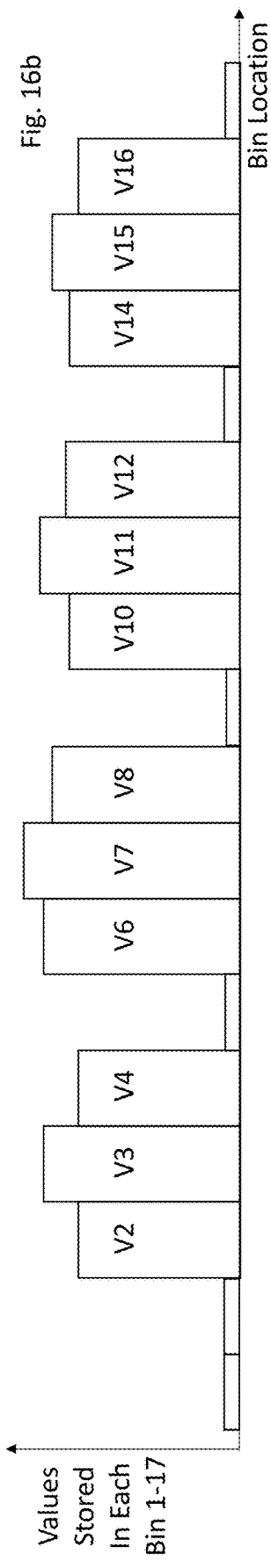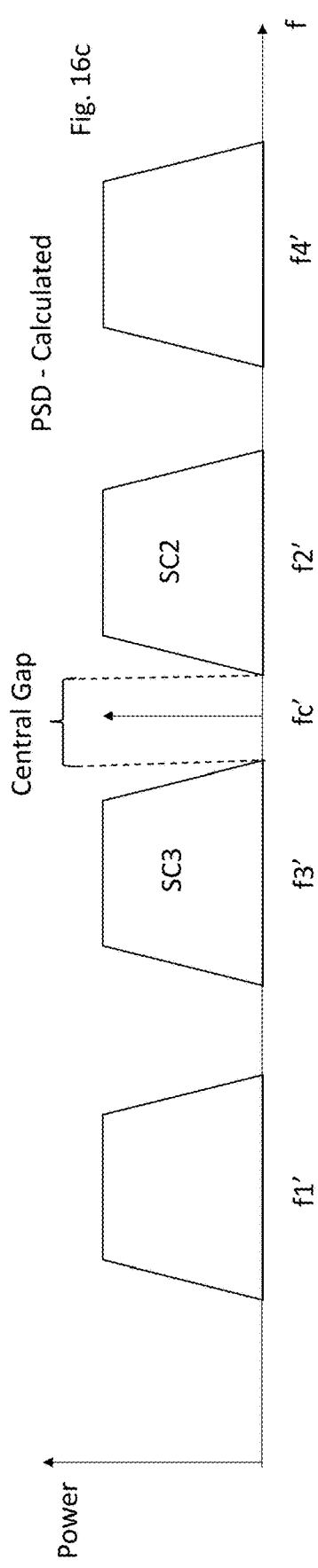

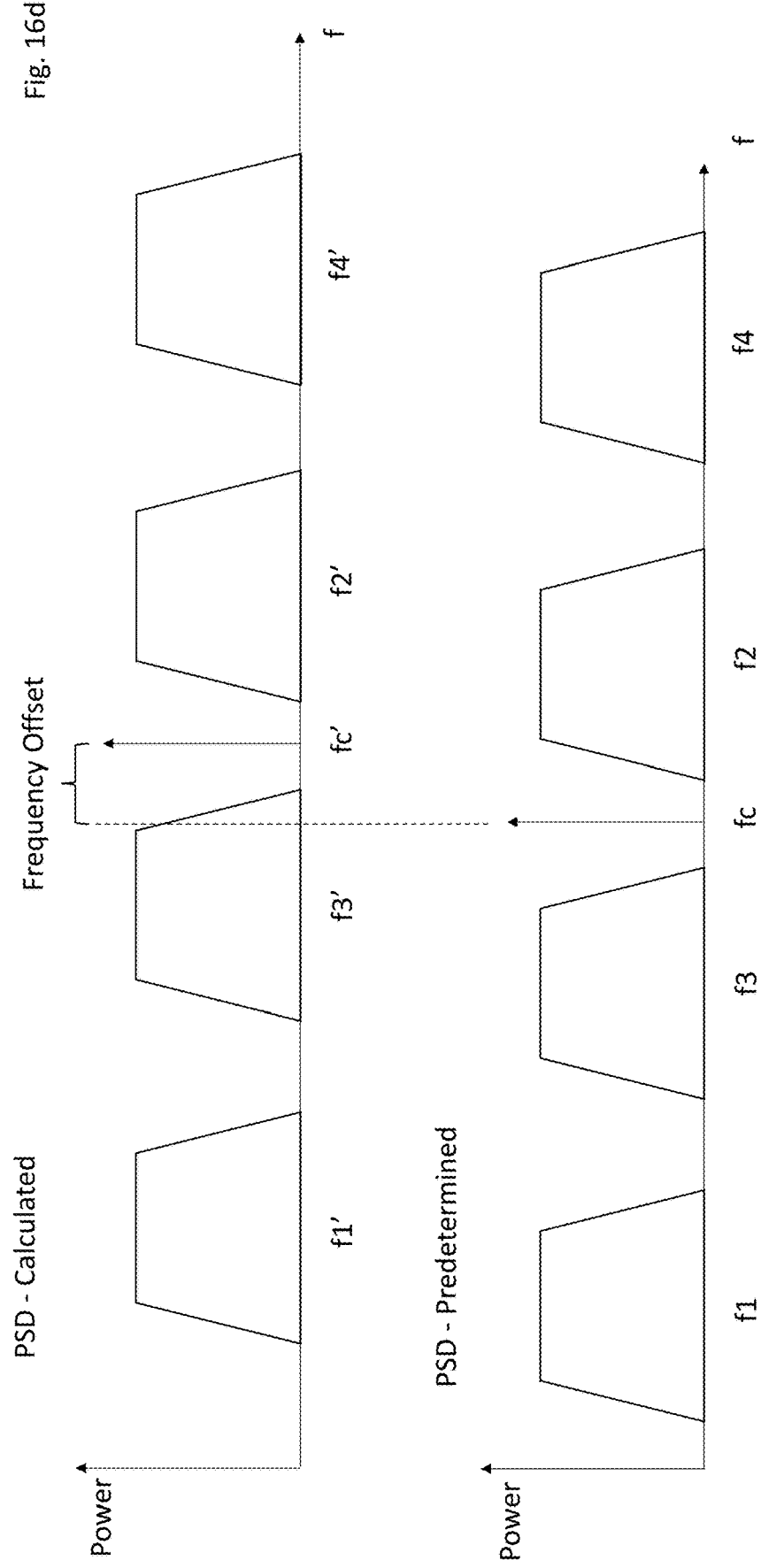

HUB-LEAF LASER SYNCHRONIZATION

This application claims the benefit of U.S. Provisional Patent Application No. 62/913,484 filed Oct. 10, 2019, which is incorporated herein by reference in its entirety.

BACKGROUND

In a so-called "Metro" network, a high data capacity or "hub" node communicates with multiple low data capacity "leaf" nodes. By providing such low capacity nodes, the overall system cost is reduced relative to a system in which the leaf nodes also have high capacity. In the metro network, the hub node transmits optical signals in a downlink or downstream direction to the leaf nodes and each such leaf node transmits signals in the upstream direction to the hub node.

SUMMARY

Consistent with the present disclosure, a network is provided that includes a hub or primary node and a plurality of leaf or secondary nodes. In the downlink direction, optical signals output from the primary node may be supplied to an optical splitter, which may supply a power-split portion of each optical signal to a corresponding secondary nodes. That is, the optical signals output from primary node are broadcast to the secondary nodes by the optical splitter. Preferably, coherent detection is employed in each secondary node to achieve high receiver sensitivity and to extract amplitude, frequency, and phase information from the received optical signals, and, therefore, higher capacity in the same bandwidth than what may be obtained with direct detection.

The coherent receiver in each secondary node includes, for example, a local oscillator laser, an optical hybrid circuit, and a photodiode circuit, such as a balanced photodiode or detector. The local oscillator laser, in conjunction with the optical hybrid circuit serve to "beat" with the incoming optical signals from the primary node to down convert the received optical signals to the baseband. Tuning the local oscillator laser to a desired frequency may, therefore, permit selection of a particular incoming optical signal frequency associated with a particular secondary node.

In the uplink direction, optical signals are transmitted from each secondary node are combined by an optical combiner and output to the primary node. One approach to detecting such optical signals involves providing a local oscillator laser and optical hybrid circuit for each optical signal. Thus, for example, in this scenario, if eight secondary nodes are provided in a network, eight local oscillator lasers and optical hybrid circuits would be provided in the primary node in order to coherently detect a corresponding one of the optical signals transmitted by secondary nodes. Including such local oscillator lasers and optical hybrid circuits in the primary node increases the cost of the primary node as well as the complexity of the primary node.

Consistent with the present disclosure, however, each secondary node local oscillator laser supplies light that is used for both coherent detection and transmission and the frequency of such light is synced or synchronized with the primary node laser. Put another way, each secondary node laser has a frequency that is controlled to be the same as or minimally offset from the primary node laser, such that, the optical signals supplied to the primary node from the secondary nodes have the same or are minimally offset from the primary node laser. In one example, only one primary node laser and optical hybrid circuit is required to coherently detect the uplink optical signals transmitted from the primary nodes.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) and together with the description, serve to explain the principles of the invention.

BRIEF DESCRIPTION OF THE DRAWINGS

FIGS. 1a and 1b illustrate a block diagram of a communication system consistent with the present disclosure;

FIGS. 15a-15i show examples of power spectral density plots consistent with the present disclosure; and FIG. 16a shows an example of frequency bins consistent with the present disclosure;

FIG. 16b shows an example of data stored in the frequency bins of FIG. 16a; and

FIGS. 16c and 16d show examples of power spectral density plots consistent with an aspect of the present disclosure.

DESCRIPTION OF THE EMBODIMENTS

Figure 1B:
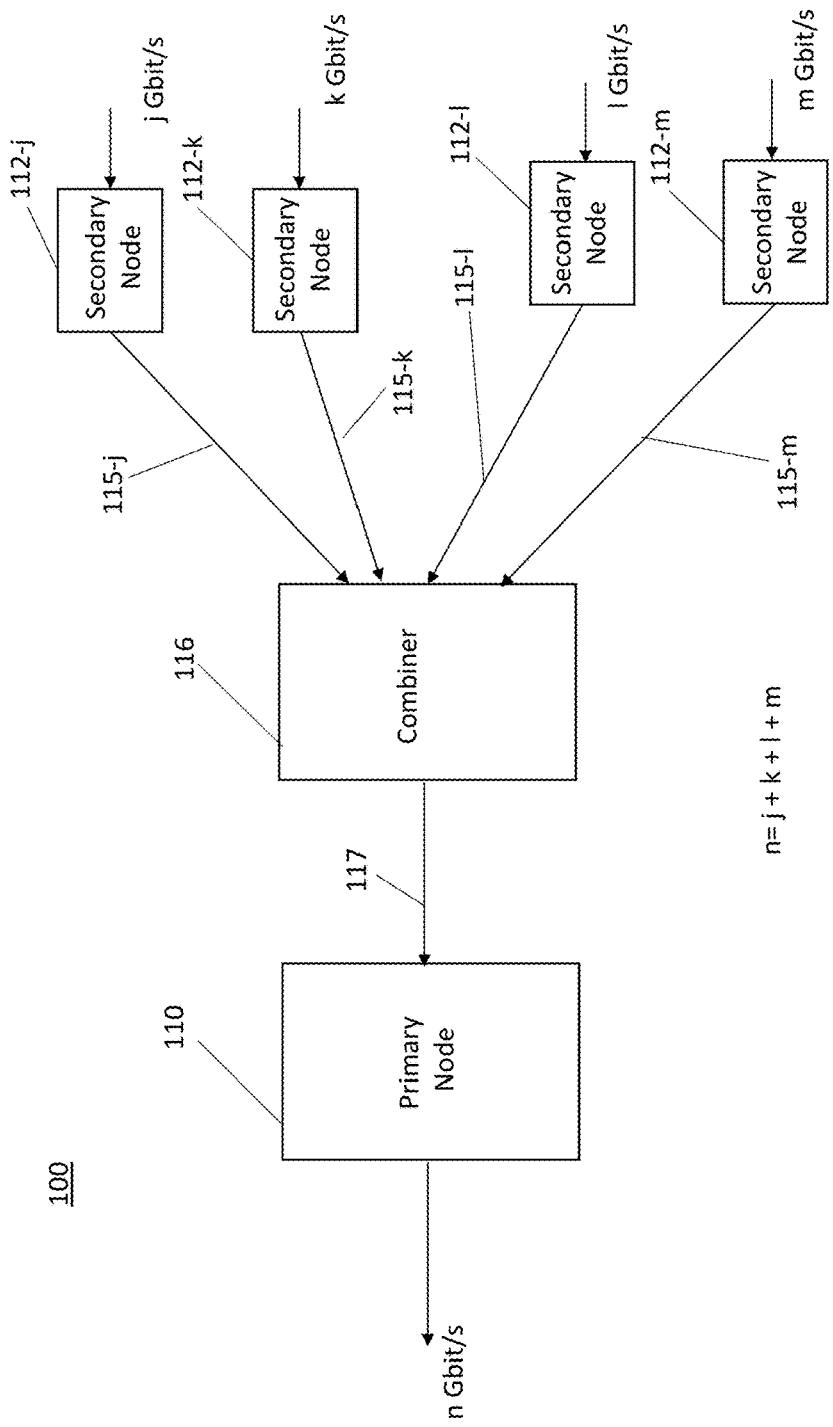

Consistent with the present disclosure a network is provided that includes a primary node and a plurality of secondary nodes. The primary node, as well as each of the secondary nodes, includes a laser that is "shared" between the transmit and receive sections. That is, light output from the laser is used for transmission as well as for coherent detection. In the coherent receiver, the frequency of the primary node laser is detected and, based on such detected frequency, the frequency of the secondary node laser is adjusted to detect the received information or data. Such frequency detection also serves to adjust the transmitted signal frequency, because the laser is shared between the transmit and receive portions in each secondary receiver. Light output from the primary node laser, which is also shared between transmit and receive portions in the primary node, is thus also set to a frequency that permits detection of each of the incoming optical signals by way of coherent detection. Since, in this example, only one laser is employed in the primary node, the primary node may have a simpler design and may be less expensive to manufacture compared to a primary node having multiple local oscillator lasers, each associated with a corresponding uplink optical signal. Consistent with a further aspect of the present disclosure, each optical signal input to the primary node includes, for example, an optical subcarrier, and, in a further example, each such optical subcarrier is a Nyquist subcarrier. In addition, the light output from the primary node laser is modulated to provide a modulated optical signal including, in one example, optical subcarriers, which are Nyquist optical subcarriers in a further example.

Reference will now be made in detail to the present embodiments of the present disclosure, an examples of which are illustrated in the accompanying drawings. Wherever possible, the same reference numbers will be used throughout the drawings to refer to the same or like parts.

FIG. 1a illustrates an example of an aggregation network 100 consistent with the present disclosure in which primary node 110 may communicate with multiple secondary nodes 112-j to 112-m, which sometimes may be referred to individually or collectively as secondary node(s) 112. Secondary nodes 112, in one example, are remote from primary node 110. Primary node 110 may transmit optical subcarriers, described in greater detail below, in a downstream direction onto an optical communication path 111, which, like each of optical communication paths 113-j to 113-m, may include one or more segments of optical fiber, as well as one or more optical amplifiers, reconfigurable add-drop multiplexers (ROADMs) or other optical fiber communication equipment. Splitter 114 may be coupled to an end of optical communication path 111 to receive the optical subcarriers and provide a power split portion of each subcarrier to a corresponding one of secondary nodes 112-j to 112-m via a respective one of optical communication paths 113-j to 113-m.

As further shown in FIG. 1a, primary node 110 has a data capacity to receive n Gbit/s of data (e.g., a data stream) for transmission to secondary node 112. Each secondary node 112 may receive and output to a user or customer a portion of the data input to primary node 110. In this example, secondary nodes 112-j, 112-k, 112-l, and 112-m output j Gbit/s, k Gbit/s, l Gbit/s, and m Gbit/s of data (data streams), respectively, whereby the sum of the j, k, l, and m may equal n (where j, k, l, m, and n are positive numbers).

FIG. 1b show transmission of additional subcarriers in an upstream direction from secondary nodes 112-j to 112-m to primary node 110. As further shown in FIG. 1b, each of secondary nodes 112-j to 112-m may transmit a corresponding group of subcarriers or one subcarrier to optical combiner 116 via a respective one of optical communication paths 115-1 to 115-m. Optical combiner 116 may, in turn, combine the received optical subcarriers from secondary nodes 112-j to 112-m onto optical communication path 117. Optical communication paths 115-1 to 115-m and 117 may have a similar construction as optical communication paths 111 and 112-l to 112-m.

As further shown in FIG. 1b, each of secondary nodes 112-j to 112-m receives a respective data stream having a corresponding data rate of j Gbit/s, k Gbit/s, l Gbit/s, and m Gbit/s. At primary node 110, data contained in these streams may be output such that the aggregate data supplied by primary node 110 is n Gbit/s, such that, as noted above, n may equal the sum of j, k, l, and m.

In another example, subcarriers may be transmitted in both an upstream and downstream direction over the same optical communication path. In particular, selected subcarriers may be transmitted in the downstream direction from primary node 110 to secondary nodes 112, and other subcarriers may be transmitted in the upstream direction from secondary nodes 112 to primary node 110.

In some implementations, network 100 may include additional primary and/or secondary nodes and optical communication paths, fewer primary and/or secondary nodes and optical communication paths or may have a configuration different from that described above. For example, network 100 may have a mesh configuration or a point-to-point configuration.

Figure 1C:
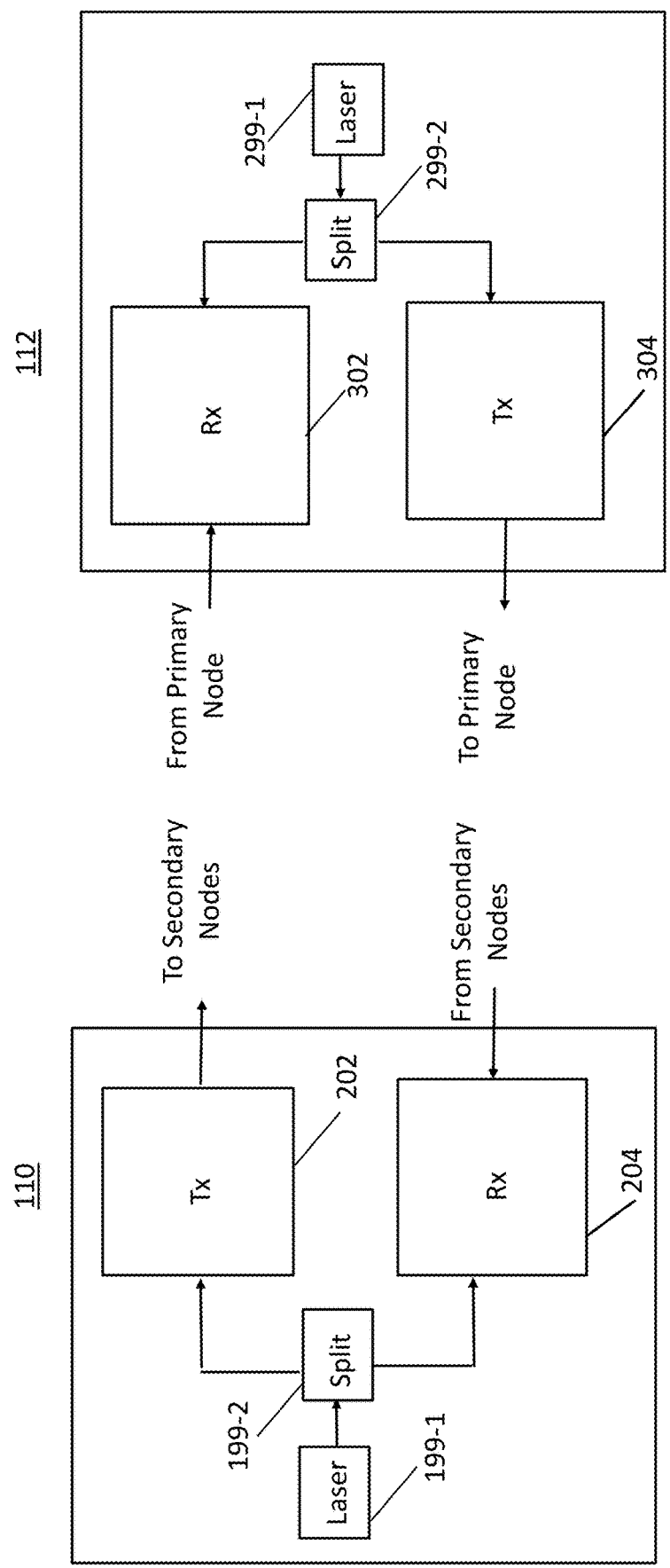
FIG. 1c illustrates a block diagram of a primary node and a secondary node consistent with an aspect of the present disclosure.

FIG. 1c illustrates primary node 110 and one of secondary nodes 112 in greater detail. Primary node 110 may include a transmitter or transmitter portion 202 that supplies a downstream modulated optical signal including subcarriers, and a receiver or receiver portion 204 that may receive upstream subcarriers carrying data originating from the secondary nodes, such as nodes 112-j to 112-m. In one example, laser 199-1 may be provided in primary node 110. Laser 199-1 may provide light or an optical signal to a splitter 199-2, that provides a first portion of the received light to transmitter portion 202 and a second portion of the received light to receiver portion 204. The first portion of the light output from laser 199-1 may be supplied to a modulator in transmitter 202 to provide a modulated optical signal that is output from transmitter 202. In a further example, the second portion of the light output from laser 199-1 may be supplied as a local oscillator signal to receiver 204 to facilitate detection of the incoming optical subcarriers. Thus, laser 199-1 is "shared" between transmitter 202 and receiver 204.

It is understood that primary node transmitter 202 may have a similar construction as secondary node transmitter 304 and primary node receiver 204 may have a similar construction as secondary node receiver 302. The components that are included in primary node 110, however, may support a higher bandwidth than the components included in secondary node 112. In one example, such higher bandwidth is realized as the number of optical subcarriers that may be transmitted the primary and secondary nodes, such that primary node 110, transmits more subcarriers and processes more received subcarriers than each of secondary nodes 112.

FIG. 1c further shows a block diagram of one of secondary nodes 112, which may include a receiver circuit 302 that receives one or more downstream transmitted subcarriers, and a transmitter circuit 304 that transmits one or more subcarriers in the upstream direction. Laser 299-1 may provide light or an optical signal to splitter 299-2. Laser 299-1 is shared between transmitter 304 and receiver 302, such that a first portion of the light output from laser 299-1 is provided to transmitter or transmitter portion 202 and a second portion of the light output from laser 299-1 is provided to receiver or receiver portion 204. The first portion of the light output from laser 299-1 may be modulated by a modulator in transmitter circuit 304 and transmitted to receiver 204 along with modulated light output from other secondary node 112, and the second portion of the light output from laser 299-1 may serve as a local oscillator signal supplied to receiver 302 to detect downstream optical subcarrier output from primary node 110. In one example, laser 299-1 is a distributed feedback (DFB) laser. Receiver 302 and transmitter 304 are discussed in greater detail below.

Figure 1D:
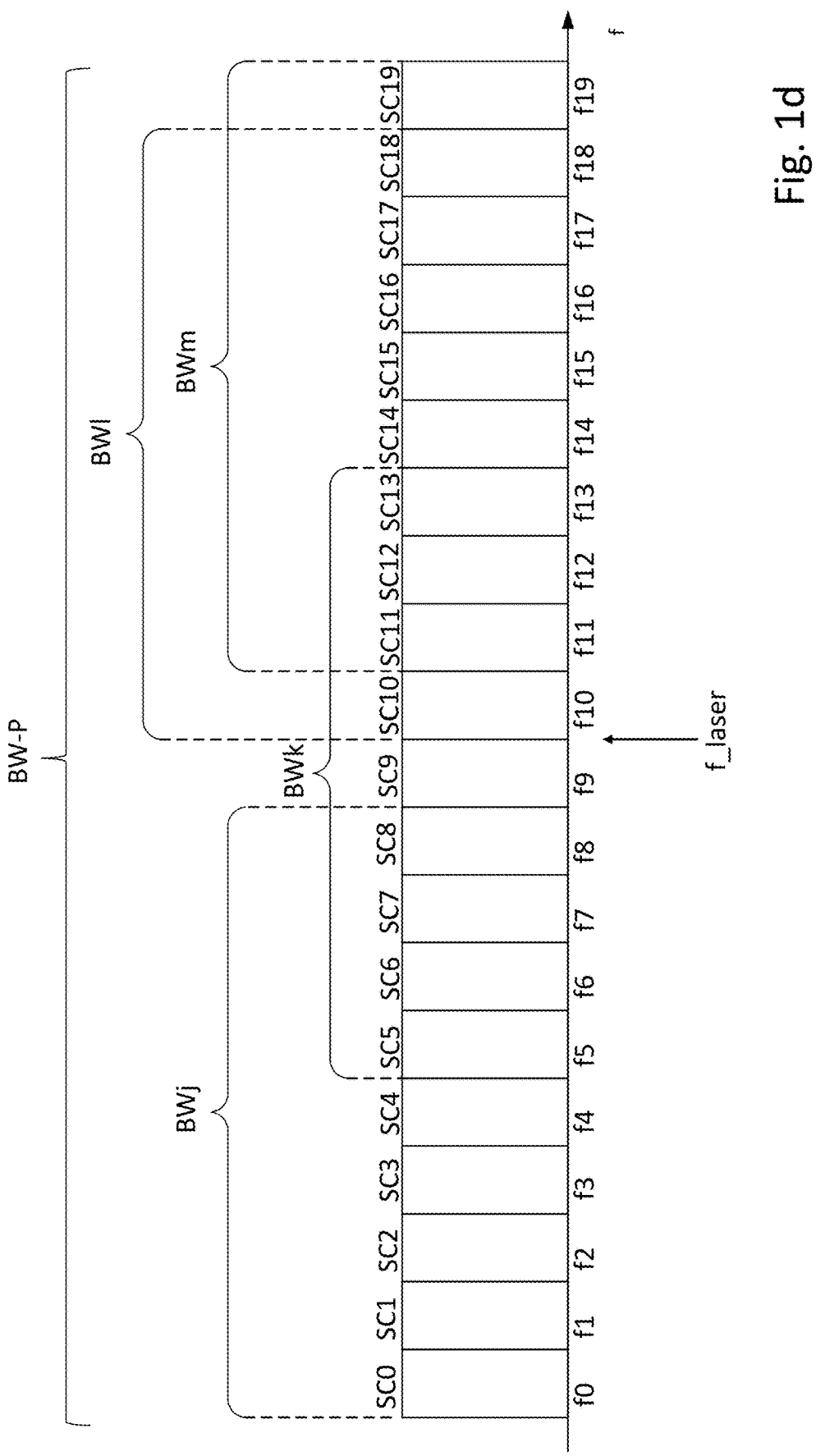
FIG. 1d shows a power spectral density plot consistent with an aspect of the present disclosure.

FIG. 1*d* illustrates an example of a power spectral density plot of an example of an optical signal output transmitter 202 from primary node 110. Here, the primary node modulated optical signal includes twenty optical subcarriers (SC0 to SC19), the frequencies of which may be provided above and below f_laser, the frequency of light output from primary node laser 199-1. It is understood that more or fewer optical subcarriers may be transmitted consistent with an aspect of the present disclosure. Each of subcarriers SC0 to SC19, in this example, has a corresponding one of frequencies f0 to f19. Subcarriers SC0 to SC19, in one example, are Nyquist subcarriers, which are a group of optical signals, each carrying data, wherein (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baud rate of such subcarrier. In some implementations, additional subcarriers or fewer subcarriers may be provided, as indicated in the examples described below.

Each of nodes 112 has an associated bandwidth BW or frequency range encompassing frequencies of subcarriers, which can be processed to output data, by a given node 112. Example bandwidths of each of secondary nodes 112 are further shown in FIG. 1*d*. Namely, bandwidth BWj associated with secondary node 112-*j* extends over or encompasses a range including frequencies f0 to f8 of subcarriers SC0 to SC8, respectively; bandwidth BWk associated with secondary node 112-*k* extends over or encompasses a range including frequencies f5 to f13 of subcarriers SC5 to SC13, respectively; bandwidth BWl associated with secondary node 112-*l* extends over or encompasses a range including frequencies f10 to f18 of subcarriers SC10 to SC18, respectively; and bandwidth BWm associated with secondary node 112-*m* extends over or encompasses a range including frequencies f11 to f19 of subcarriers SC11 to SC19, respectively. On the other hand, the bandwidth of primary node 110, BW-P, encompasses the entire range of frequencies f0-f19 of subcarriers SC0 to SC19. As noted above, optical subcarriers having frequencies within a given bandwidth associated with a particular node may be processed by that node, and data associated with such optical subcarriers may be output from that node.

As further shown in FIG. 1*d*, certain subcarriers have frequencies that fall within multiple bandwidths. For example, subcarriers SC5 and SC6 have frequencies that fall within bandwidth BWj and bandwidth BWk. The data carried by such subcarriers may, therefore, be detected and selectively output from either secondary node 112-*j* or 112-*k*. For example, if a customer requires that more data be received and output from secondary node 112-*k* and less data be output from secondary node 112-*j*, nodes 112-*j* and 112-*k* may be controlled or dynamically configured such that the data carried by subcarriers SC5 and SC6 may be assigned to and output from secondary node 112-*k*, but not secondary node 112-*j*. Accordingly, as described in greater detail below, the data output from each node may be adapted to customer requirements that vary over time.

As further shown in FIG. 1*d*, certain subcarriers, such as subcarriers SC2, SC7, SC12, and SC17, may be designated or dedicated to carry information related to a parameter or characteristic associated with one or more of secondary nodes 112. For example, such parameters may correspond to an amount of data, data rate, or capacity to be output by one or more secondary nodes. In particular, such subcarriers may carry information, for example, to configure or adjust the amount of data, capacity or data rate of data output from secondary nodes 112-*j* to 112-*m*, respectively, as noted above. In a further example, each of these subcarriers may carry user or customer data (also referred to as client data) in addition to control information.

In a further example, subcarriers SC2, SC7, SC12, and SC17 are modulated to carry control or operations administration and maintenance (OAM) information and related data corresponding to parameters associated therewith, such as the capacity and status of nodes 112. In an additional example, subcarrier SC2 is modulated carry such control and parameter information associated with node 112-*j*, subcarrier SC7 is modulated to carry such control and parameter information associated with node 112-*k*, subcarrier SC12 is modulated to carry such control and parameter information associated with node 112-*l* and subcarrier SC17 is modulated to carry such control and parameter information associated with node 112-*m*.

As discussed in greater detail below, the optical subcarriers are generated by modulating light output from a laser. The frequency of such light, f_laser, in one example, has a value midway between the uppermost and lowermost frequencies of the generated subcarriers, such as frequencies f1 and f20.

Figure 1E:
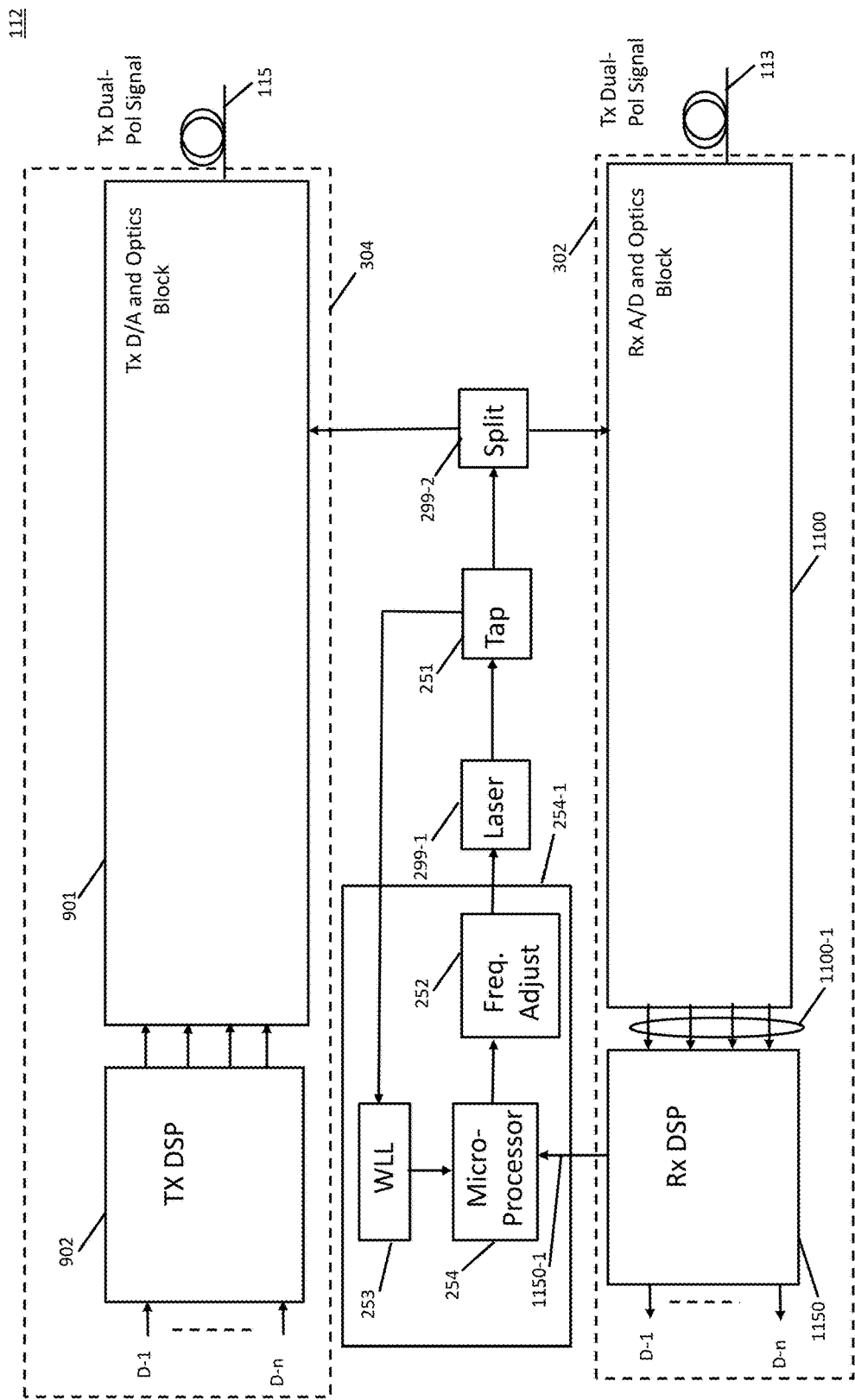
FIG. 1e shows a detailed block diagram of a secondary node consistent with the present disclosure.

FIG. 1*e* shows one of nodes 112 in greater detail. As noted above, node 112 includes, a receiver 302, which receives one or more optical subcarriers, such as optical subcarriers SC0 to SC19. In particular, receiver 302 includes Rx A/D and Optics Block 1100 which is coupled or connected to one of optical communication paths 113 to receive one or more optical subcarriers noted above are supplied. Based on the received optical subcarriers, Rx A/D and Optics Block 1100 outputs one or more electrical signals 1100-1 to receiver digital signal processor (Rx DSP) 1150. Based on electrical signals 1100-1, Rx DSP 1150, outputs client data D-1' to D-n' associated with information carried by the one more optical subcarriers input to and processed by node 112.

As further shown in FIG. 1*e*, laser 299-1 supplies an optical signal to an optical tap 251, which in turn, provides a portion of the signal, e.g. 10% of the power of the input optical signal, to a wavelength locking circuit, including for example, an etalon. The remaining optical signal output from tap 251 is supplied to splitter 299-2.

Splitter 299-2 supplies a first portion of the received light from tap 251 to Tx D/A and Optics Block 901 and a second portion of the received light from tap 251, as a local oscillator signal, to Rx A/D and Optics Block 110. As discussed in greater detail below, Rx A/D and Optics Block outputs electrical signals 1100-1 to Rx DSP 1150 based on the input local oscillator signal from splitter 299-2 as well as subcarriers input to block 1100 from optical communication path or fiber 113.

Based on electrical signals 1100-1, Rx DSP 1150 outputs data streams D-1' to D-n', each of which being associated with or corresponding to information carried by a respective one of optical subcarriers. It is noted, however, that, in one example, the number of data streams D-1' to D-n' is less than a number of optical subcarriers input to Rx A/D and Optics block 1100.

Rx DSP 1150 also outputs a first signal 1150-1, for example, a first electrical signal, indicative of the frequency of one or more of the optical subcarriers to a circuit, such as control circuit 254-1. In addition, in one example, control circuit 254-1 receives a second signal, for example, a second electrical signal, from wavelength locker (WLL) circuit 253 indictive of the frequency of light output from tap 251 to WLL 253. In the example, shown in FIG. 1e, WLL circuit 253 is provided within control circuit 254-1. In another example, WLL circuit 253 is provided external to control circuit 254-1. In a further example, WLL 253-1 provides an electrical signal to frequency adjusting circuit 252 in addition to the output from microprocessor 254 (see below). Based on the first and/or second signals, control circuit 254-1, in one example, outputs a control signal to frequency adjusting circuit 252, which is operatively coupled to laser 299-1 to control the frequency of light output therefrom.

Figure 2B:
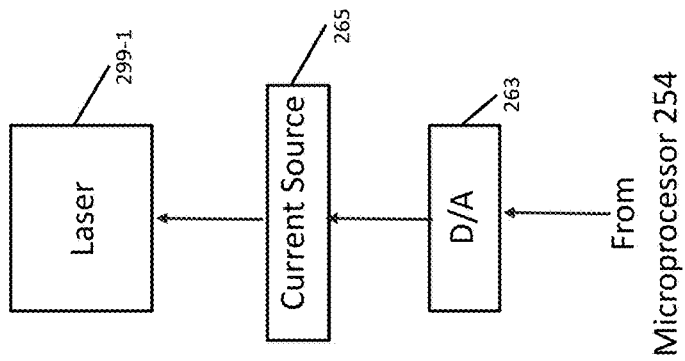
FIGS. 2a and 2b show examples of a frequency adjusting circuit consistent with the present disclosure.
Figure 2A:
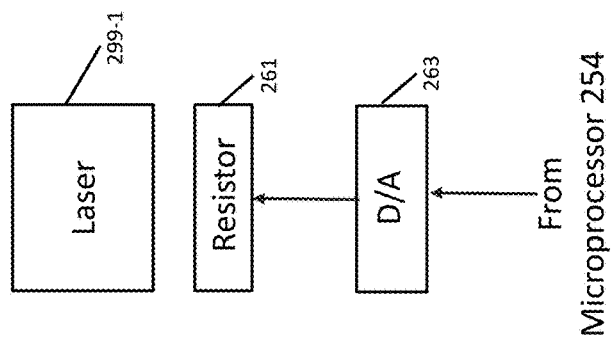

FIGS. 2a and 2b shows examples of frequency adjusting circuit 252 in greater detail. In the example shown in FIG. 2a, the control signal output from control circuit 254-1 is typically a digital signal indicative or representative of a desired frequency of light output from laser 299-1. A digital to analog converter circuit 263 converts the received digital signal to an analog signal, which is then supplied to a temperature adjusting element 261. Temperature adjusting element 261 is a thin firm resistor, in one example, including a material such as a tantalum nitride, tungsten, platinum. Upon application of the analog signal, the temperature of temperature adjusting element 261 changes, for example, because element 261 is heated. Temperature adjusting element 261 is preferably placed sufficiently close to laser 299-1, such that element 261 controls the temperature of laser 299-1 and thus the frequency output from laser 299-1 based on the analog signal and the control signal output from control circuit 254-1.

In another example, temperature controlling element is a thermoelectric cooler (TEC).

In various embodiments, the control circuit 254-1 may be implemented in hardware on a printed circuit board, for example, using inductors, resistors, capacitors, etc. Optionally, in one example, control circuit 254-1 may be implemented to include a microprocessor, such as microprocessor 254 shown in FIG. 1e. As used herein, the term microprocessor may include any computer or processor-based or microprocessor-based system including systems using microcontrollers, reduced instruction set computers (RISC), application specific integrated circuits (ASICs), programmable gate array (PGA), field programmable gate array (FPGAs), logic circuits, and any other circuit or processor capable of executing the functions described herein. Microprocessor 254 may be integrated with DSP 1150 or may be provided separate from DSP 1150.

FIG. 2b shows another example of frequency adjusting circuit 252. Here, instead of a temperature adjusting element 261, such as a resistor or TEC, digital to analog conversion circuit 267 supplies the analog signal to a current source 265, which, in turn, adjust a current supplied to laser 299-1. The amount of current supplied to laser 299-1 may also adjust the temperature of and thus the frequency of light output from laser 299-1 based on the analog signal and the control signal output from control circuit 254-1.

Thus, the control signal output from control circuit 254-1 is based, at least in part, on a frequency of an incoming primary node modulated optical signal, such as a frequency associated with one or more of the received optical subcarriers. Accordingly, the frequency of the light or optical signal output from laser 299-1 is based on a frequency associated with the primary node modulated optical signal. In one example, the frequency of light output from laser 299-1 may be controlled to be equal to or substantially equal to the frequency of light output from laser 199-1, f_laser. Put another way, the frequency of the light output from the lasers in each of secondary nodes 112 may be synchronized to the light output from laser 199-1 in primary node 110.

As discussed in greater detail below, a first portion of the light output from laser 299-1, having a frequency controlled or adjusted as noted above, is provided to Rx A/D and Optics Block 1100 and a second portion of such light is provided to Tx D/A and Optics Block 901. Based on data D-1 to D-n supplied Tx DSP 902, electrical signals are output from Tx DSP 902 to Tx D/A and Optics Block 901, and, based on such electrical signals, the second light portion is modulated to provide a modulated optical signal including at least one optical subcarrier that is transmitted upstream to primary node 110. Thus, the frequency of such subcarrier is based on a frequency associated with the primary node optical signal received by secondary node 112. The one or more subcarriers output from the secondary node may be similar to that discussed above in connection with FIG. 1d.

In the primary node, a portion of light output from one laser, e.g., laser 199-1, may be used as a local oscillator signal for detecting subcarriers provided from each of secondary nodes 112. Since the frequencies of the secondary node optical subcarriers are based on the frequency of light output from laser 199-1, separate local oscillators to detect optical subcarriers output from each secondary node are unnecessary and the cost of primary node 110 may be reduced. Rather, light output from laser 199-1 may serve as a local oscillator signal to detect each of the received optical subcarriers from secondary nodes 112. As a result, system cost and complexity may be reduced.

Details of the structure and operation of Rx DSP 1150, Rx A/D and Optics Block 1100, Tx DSP 902, and Tx D/A and Optics Block 901 will next be described.

Figure 3:
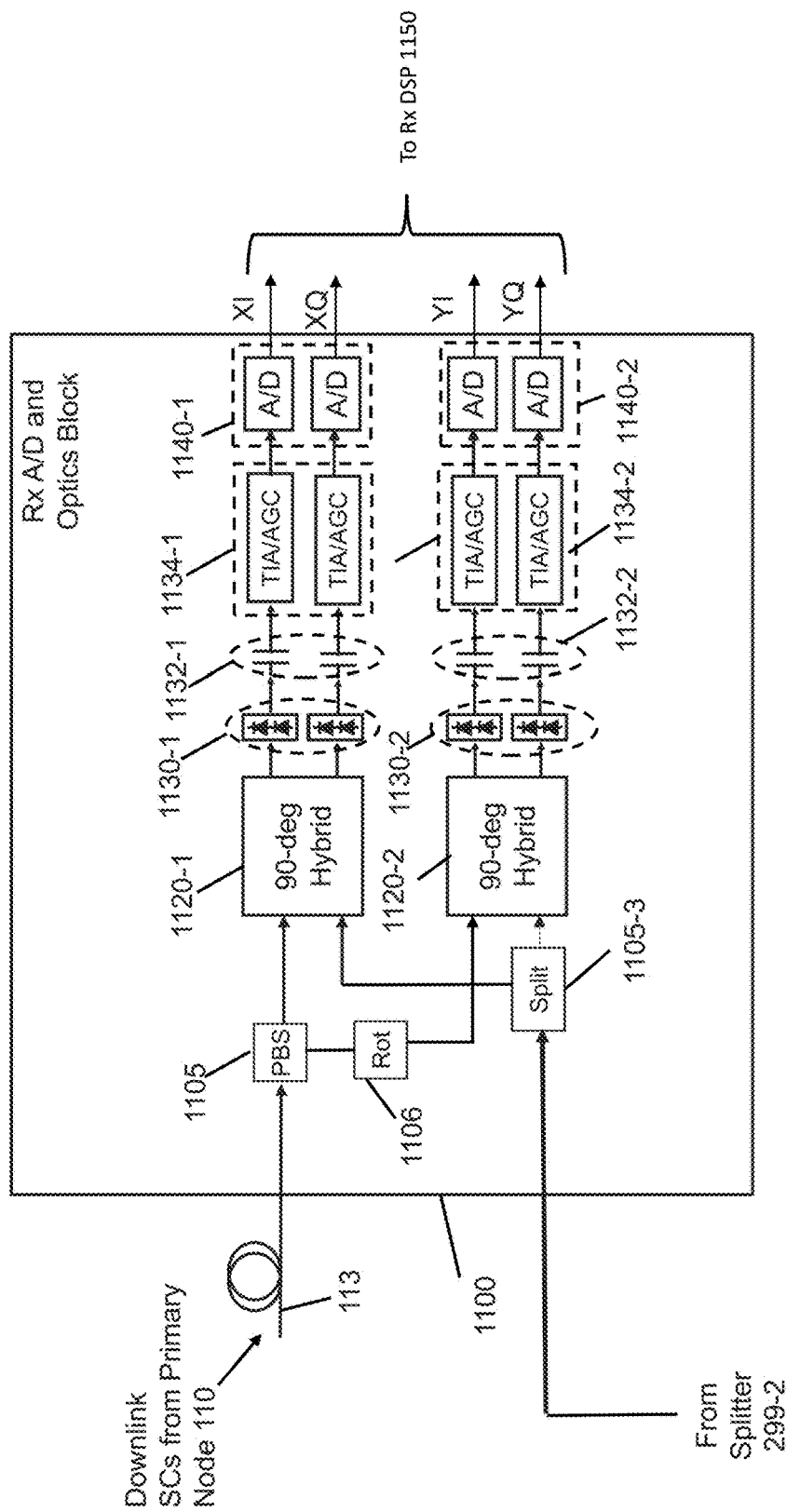
FIG. 3 shows an example of a portion of a secondary node receiver consistent with an aspect of the present disclosure.

Rx A/D and Optics Block 1100 is shown in greater detail in FIG. 3b. As shown in FIG. 3b, Rx optics and A/D block 1100, in conjunction with Rx DSP 1150, may carry out coherent detection in receiver 302. Block 1100 may include a polarization splitter (PBS) 1105 with first (1105-1) and second (1105-2) outputs), a local oscillator (LO) laser 1110, 90 degree optical hybrids or mixers 1120-1 and 1120-2 (referred to generally as hybrid mixers 1120 and individually as hybrid mixer 1120), detectors 1130-1 and 1130-2 (referred to generally as detectors 1130 and individually as detector 1130, each including either a single photodiode or balanced photodiode), AC coupling capacitors 1132-1 and 1132-2, transimpedance amplifiers/automatic gain control circuits TIA/AGC 1134-1 and 1134-2, ADCs 1140-1 and 1140-2 (referred to generally as ADCs 1140 and individually as ADC 1140).

Polarization beam splitter (PBS) 1105 may include a polarization splitter that receives an input polarization multiplexed optical signal including optical subcarriers, such as SC0 to SC19, from primary node 110 via optical communication path 113. Optical communication path 113 includes, for example, an optical fiber segment, as noted above. PBS 1105 may split the incoming optical signal into the two X and Y orthogonal polarization components. The Y component may be supplied to a polarization rotator 1106 that rotates the polarization of the Y component to have the X polarization. Hybrid mixers or 90 degree optical hybrid circuits 1120 may combine the X and rotated Y polarization components with light from local oscillator laser 1110, which, in one example, is a tunable laser. For example, hybrid mixer 1120-1 may combine a first polarization signal (e.g., the component of the incoming optical signal having a first or X (TE) polarization output from a first PBS port with light from local oscillator 1110, and hybrid mixer 1120-2 may combine the rotated polarization signal (e.g., the component of the incoming optical signal having a second or Y (TM) polarization output from a second PBS port) with the light from local oscillator 1110. In one example, polarization rotator 1190 may be provided at the PBS output to rotate Y component polarization to have the X polarization.

Detectors 1130 may detect mixing products output from the optical hybrids, to form corresponding voltage signals, which are subject to AC coupling by capacitors 1132-1 and 1132-1, as well as amplification and gain control by TIA/AGCs 1134-1 and 1134-2. The outputs of TIA/AGCs 1134-1 and 1134-2 and ADCs 1140 may convert the voltage signals to digital samples. For example, two detectors (e.g., photodiodes) 1130-1 may detect the X polarization signals to form the corresponding voltage signals, and a corresponding two ADCs 1140-1 may convert the voltage signals to digital samples (XI, XQ) for the first polarization signals after amplification, gain control and AC coupling. Similarly, two detectors 1130-2 may detect the rotated Y polarization signals to form the corresponding voltage signals, and a corresponding two ADCs 1140-2 may convert the voltage signals to digital samples (YI, YQ) for the second polarization signals after amplification, gain control and AC coupling. RX DSP 1150 may process the digital samples associated with the X and Y polarization components to output data associated with one or more subcarriers within a group of subcarriers SC0 to SC19 encompassed by the bandwidth (one of bandwidths BWj, BWk, BWl, and BWm) associated with the secondary node housing the particular Rx DSP 1150.

While FIG. 3*b* shows optical receiver 302 as including a particular number and arrangement of components, in some implementations, optical receiver 302 may include additional components, fewer components, different components, or differently arranged components. The number of detectors 1130 and/or ADCs 1140 may be selected to implement an optical receiver 302 that is capable of receiving a polarization multiplexed signal. In some instances, one of the components illustrated in FIG. 11*a* may carry out a function described herein as being carry out by another one of the components illustrated in FIG. 3*b*.

Consistent with the present disclosure, in order to select a particular subcarrier or group of subcarriers at a secondary node 112, local oscillator 1110 may be tuned to output light having a wavelength or frequency relatively close to the selected subcarrier wavelength(s) to thereby cause a beating between the local oscillator light and the selected subcarrier (s). Such beating will either not occur or will be significantly attenuated for the other non-selected subcarriers so that data carried by the selected subcarrier(s) is detected and processed by Rx DSP 1150.

Figure 4:
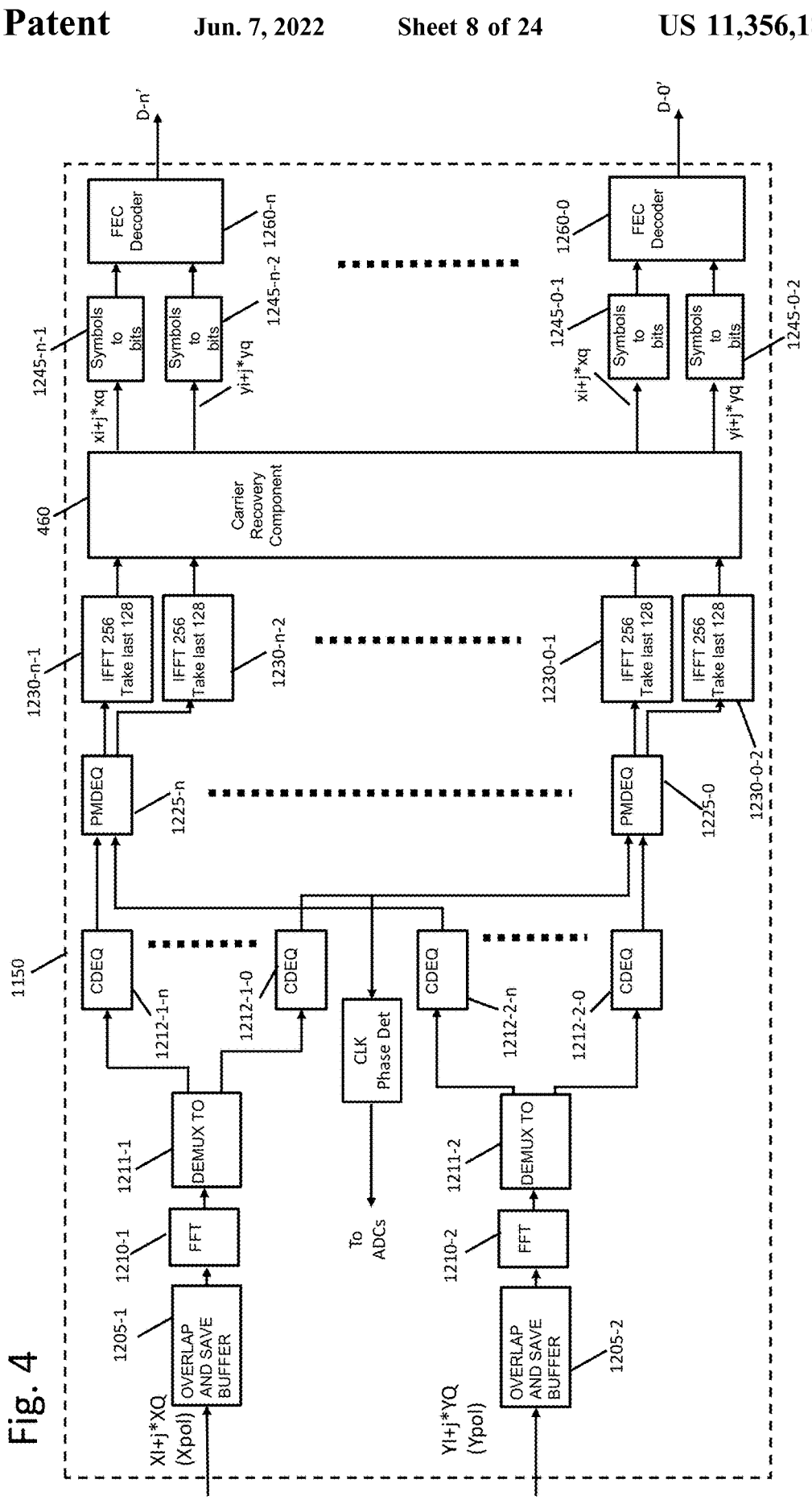
FIG. 4 illustrates a block diagram of a secondary receiver digital signal processor consistent with the present disclosure.

Rx DSP 1150 will next be described with reference to FIG. 4. As noted above, analog-to-digital (A/D) circuits 1140-1 and 1140-2 (FIG. 3*b*) output digital samples corresponding to the analog inputs supplied thereto. In one example, the samples XI, XQ, Y, YQ may be supplied by each A/D circuit at a rate of 64 GSamples/s. The digital samples correspond to symbols carried by the X polarization of the optical subcarriers and may be represented by the complex number XI+jXQ. The digital samples may be provided to overlap and save buffer 1205-1, as shown in FIG. 4. FFT component or circuit 1210-1 may receive the 2048 vector elements, for example, from the overlap and save buffer 1205-1 and convert the vector elements to the frequency domain using, for example, a fast Fourier transform (FFT). The FFT component 1210-1 may convert the 2048 vector elements to 2048 frequency components, each of which may be stored in a register or "bin" or other memory, as a result of carrying out the FFT.

The frequency components then may be demultiplexed by demultiplexer 1211-1, and groups of such components may be supplied to a respective one of chromatic dispersion equalizer circuits CDEQ 1212-1-0 to 1212-1-*n*, each of which may include a finite impulse response (FIR) filter that corrects, offsets or reduces the effects of, or errors associated with, chromatic dispersion of the transmitted optical subcarriers. Each of CDEQ circuits 1212-1-0 to 1212-1-*n* supplies an output to a corresponding polarization mode dispersion (PMD) equalizer circuit 1225-0 to 1225-*n* (which individually or collectively may be referred to as 1225).

Digital samples output from A/D circuits 640-2 associated with Y polarization components of subcarrier SC1 may be processed in a similar manner to that of digital samples output from A/D circuits 1240-1 and associated with the X polarization component of each subcarrier. Namely, overlap and save buffer 1205-2, FFT 1210-2, demultiplexer 1211-2, and CDEQ circuits 1212-2-0 to 1212-2-*n* may have a similar structure and operate in a similar fashion as buffer 1205-1, FFT 1210-1, demultiplexer 122-1, and CDEQ circuits 1212-1-0 to 1212-1-*n*, respectively. For example, each of CDEQ circuits 1212-2-0 to 1212-2-*n* may include an FIR filter that corrects, offsets, or reduces the effects of, or errors associated with, chromatic dispersion of the transmitted optical subcarriers. In addition, each of CDEQ circuits 1212-2-0 to 1212-2-*n* provide an output to a corresponding one of PMDEQ 1225-0 to 1225-*n*.

As further shown in FIG. 4, the outputs of CDEQ circuits 1212 are also supplied, for example, to an FACP circuit. As discussed in greater detail below, the FACP circuit in conjunction with other circuitry, in a further example, generates data or signals indicative of a frequency associated with one or more of the received subcarriers from primary node 110.

Returning to FIG. 4, each of PMDEQ circuits 1225 may include another FIR filter that corrects, offsets or reduces the effects of, or errors associated with, PMD of the transmitted optical subcarriers. Each of PMDEQ circuits 1225 may supply a first output to a respective one of IFFT components or circuits 1230-0-1 to 1230-*n*-1 and a second output to a respective one of IFFT components or circuits 1230-0-2 to 1230-*n*-2, each of which may convert a 256-element vector, in this example, back to the time domain as 256 samples in accordance with, for example, an inverse fast Fourier transform (IFFT).

Time domain signals or data output from IFFT 1230-0-1 to 1230-*n*-1 are supplied to carrier recovery component (CRC) 460, which may apply carrier recovery techniques to compensate for X polarization linewidths and Y polarization linewidths. In some implementations, CRC 460 may compensate or correct for frequency and/or phase differences between the X polarization of the transmit signal and the X polarization of light from laser 299-1 based on an output of CRC 460, which performs carrier recovery in connection with one of the subcarrier based on the outputs of IFFTs 1230. After such X polarization carrier phase correction, the data associated with the X polarization component may be represented as symbols having the complex representation xi+j*xq in a constellation, such as a QPSK constellation or a constellation associated with another modulation formation, such as an m-quadrature amplitude modulation (QAM), m being an integer. In some implementations, the taps of the FIR filter included in one or more of PMDEQ circuits 1225 may be updated based on one or more outputs associated with CRC 460.

In a similar manner, time domain signals or data output from IFFT 1230-0-2 to **1230-*n*-2 are also supplied to CRC 460, which may compensate or correct for Y polarization linewidths. In some implementations, CRC 460 also may correct or compensate for frequency and/or phase differences between the Y polarization of the transmit signal and the Y polarization of light from laser 299-1**. After such Y polarization carrier phase correction, the data associated with the Y polarization component may be represented as symbols having the complex representation $y_i+j*y_q$ in a constellation, such as a QPSK constellation or a constellation associated with another modulation formation, such as an m-quadrature amplitude modulation (QAM), m being an integer. In some implementations, one or more outputs of CRC 460 may be used to update the taps of the FIR filter included in one or more of PMDEQ circuits 1225.

As further shown in FIG. 4, the outputs of CRC 460 are symbols having which may be represented by the complex notation $x_i+j*x_q$ (associated with the X polarization) and $y_i=j*y_q$ (associated with the Y polarization). Such outputs may be enhanced by utilizing the known (training) bits.

Each of the symbols-to-bits circuits or components 1245-0-1 to **1245-*n*-1 may receive the symbols output from CRC 460. For example, each of the symbol-to-bits components 1245-0-1 to 1245-*n*-1 may map one X polarization symbol, in a QPSK or m-QAM constellation, to Z bits, where Z is an integer. For dual-polarization QPSK modulated subcarriers, Z is four. Bits output from each of component 1245-0-1 to 1245-*n*-1 are provided to a corresponding one of FEC decoder circuits 1260-0 to 1260-*n***.

Y polarization symbols are output form a respective one of circuits 1240-0-2 to **1240-*n*-2**, each of which has the complex representation $y_i+j*y_q$ associated with data carried by the Y polarization component. Each Y polarization, like the X polarization symbols noted above, may be provided to a corresponding one of bit-to-symbol circuits or components 1245-0-2 to **1245-*n*-2, each of which has a similar structure and operates in a similar manner as symbols-to-bits component 1245-0-1 to 1245-*n*-1. Each of circuits 1245-0-2 to 1245-*n*-2 may provide an output to a corresponding one of FEC decoder circuits 1260-0 to 1260-*n***.

Each of FEC decoder circuits 1260 may remove errors in the outputs of symbol-to-bit circuits 1245 using, for example, forward error correction. Such error corrected bits, which may include user data for output from secondary node 112, may be supplied to a corresponding one of data outputs D-0' to D-n'.

While FIG. 4 shows DSP 1150 as including a particular number and arrangement of functional components, in some implementations, DSP 650 may include additional functional components, fewer functional components, different functional components, or differently arranged functional components.

As noted above with respect to FIGS. 1e and 4, Rx DSP 1150, in one example, provide a signal 1150-1 to control circuit 254-1 indicative of light output from laser 299-1. Generation of signal 1150-1 will next be described with reference to FIG. 5A, which shows CRC 460 in greater detail.

Figure 5A:
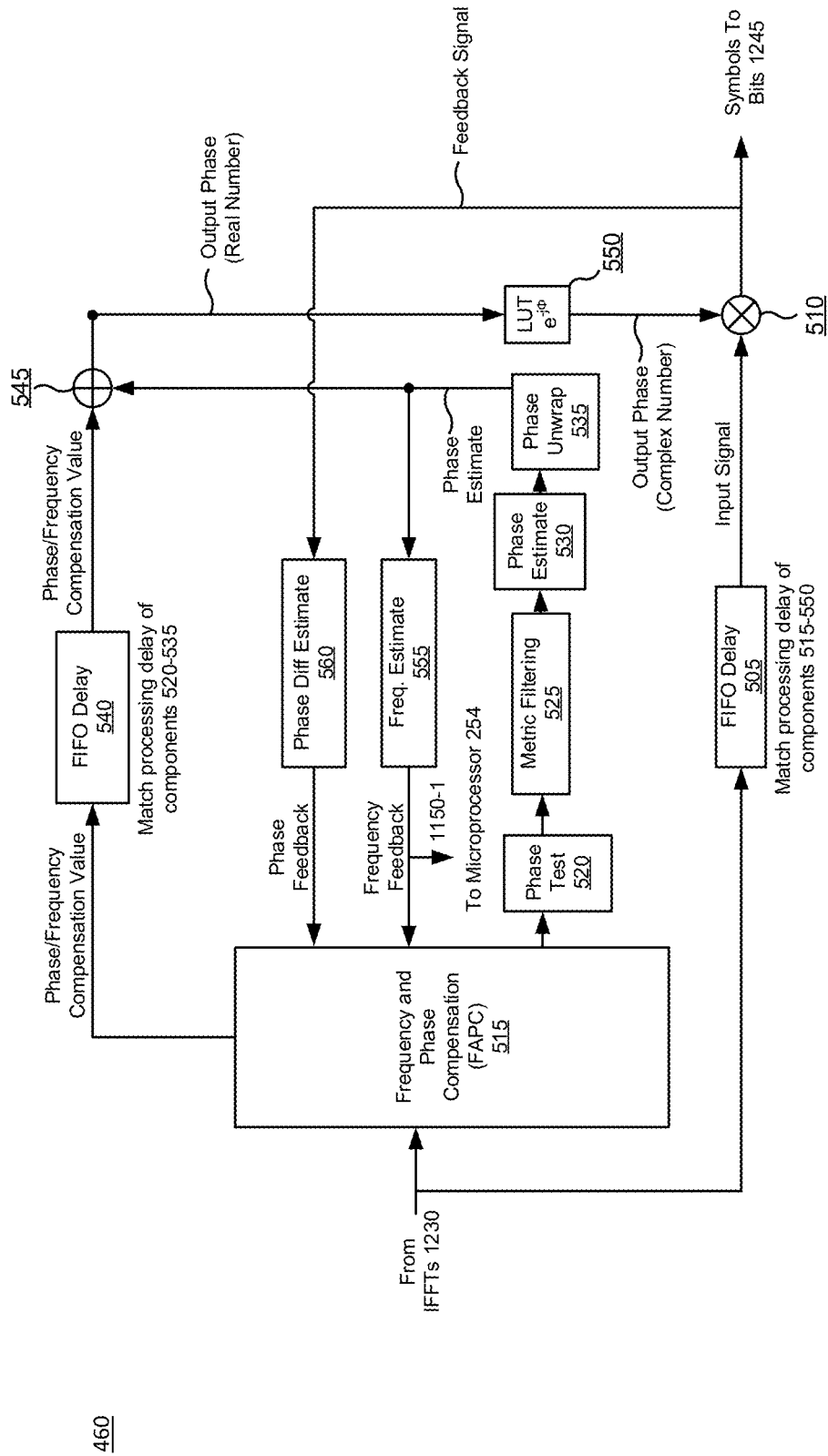
FIGS. 5A and 5B are diagrams of example components of a carrier recovery component shown in FIG. 4.

As shown in FIG. 5A, CRC 460 may include a first-in first-out delay buffer or component (FIFO Delay) 505, a multiplier component 510, a frequency and phase compensation component (FAPC) 515, a phase test component 520, a metric filtering component 525, a phase estimate component 530, a phase unwrap component 535, another FIFO Delay component 540, an adder component 545, a lookup table component (LUT) 550, a frequency estimate component 555, and a phase difference estimate component 560.

Carrier recovery component (CRC) 460 may receive an input signal (e.g., outputs from IFFTs 1230, and may pass the input signal to FIFO Delay 505, which may delay the input signal to compensate for delay introduced by operations performed by other components of CRC 460 (e.g., components 515-550) prior to an adjustment signal being received by multiplier component 510. Multiplier component 510 may receive the input signal from FIFO Delay 505, and may adjust the input signal (e.g., via multiplication, rotation, etc.) using an adjustment signal received from LUT 550. For example, multiplier component 510 may adjust a phase of the input signal using an output phase value received from LUT 550. Multiplier component 510 may output the adjusted signal as an output signal from CRC 460, and may further output the adjusted signal to a feedback loop that includes phase difference estimate component 560.

CRC 460 may also pass the input signal to FAPC 515. Components 515-550 may operate on the input signal to determine the output phase value to be provided to multiplier 510. Components 555 and 560 may be included in a feedback loop that determines feedback signals to be used to adjust operations of components 515-550 (e.g., FAPC 515).

As further shown in FIG. 5A, component 555 provides a signal 1150-1 indicative of a frequency associated with light output from a primary node laser, for example, or one or more of the optical subcarriers received by receiver 302.

Figure 5B:
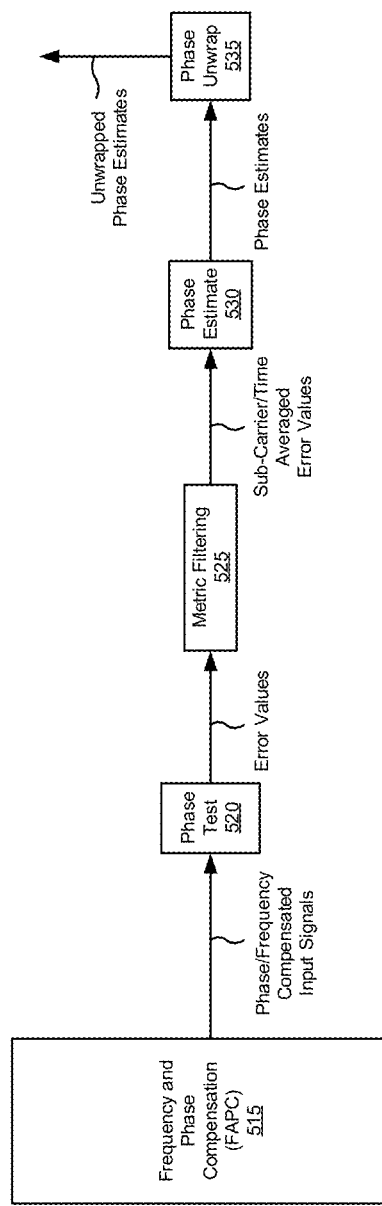

As shown in FIG. 5B, FAPC 515 may provide a phase and/or frequency compensated signal to phase test component 520. Phase test component 520 may apply test phases to the signal and may determine error values based on applying the test phases. Metric filtering component 525 may receive the error values and may average the error values over time and/or over multiple sub-carriers. Phase estimate component 530 may receive the averaged error values and may determine one or more phase estimates for the input signals based on the averaged error values. Phase unwrap component 535 may unwrap the phase estimate values across a full phase cycle (e.g., 360 degrees), and may provide the unwrapped phase estimate as shown in FIG. 5A. Components of CRC 460 will be described in more detail elsewhere herein.

The number of components shown in FIGS. 5A and 5B is provided as an example. In practice, CRC 460 may include additional components, fewer components, different components, or differently arranged components than those shown in FIGS. 5A and 5B. Additionally, or alternatively, a set of components of CRC 460 may perform one or more functions described as being performed by another set of components of CRC 460.

Figure 6:
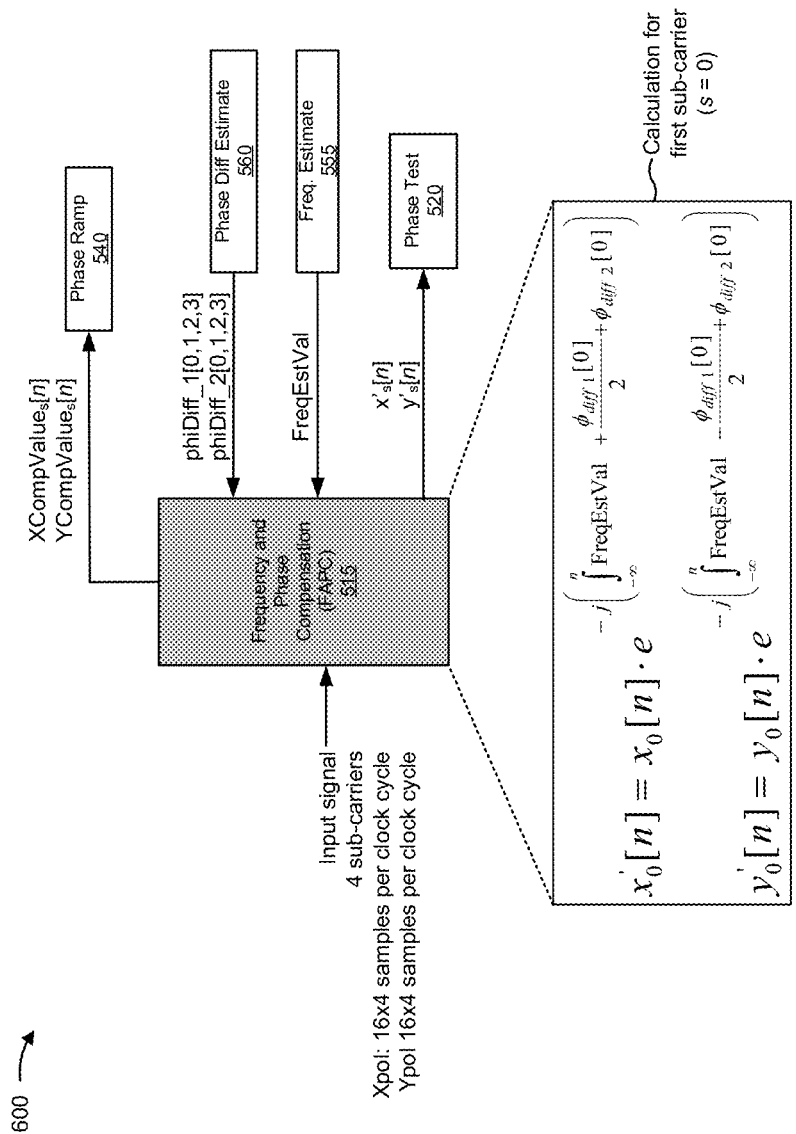
FIGS. 6-8, 9A, 9B, and 10-12 are diagrams of example implementations relating to operations performed by components of the carrier recovery component shown in FIGS. 5A and 5B.

FIG. 6 is a diagram of an example implementation 600 relating to operations performed by frequency and phase compensation component (FAPC) 515. As shown in FIG. 6, FAPC 515 may receive an input signal (e.g., a digital sample, a digital signal, etc.). In example implementation 600, FAPC 515 is shown as receiving 16 samples, on each of 4 sub-carriers that each have two polarizations (e.g., Xpol and Ypol), per clock cycle. Thus, FAPC 515 receives 64 samples on the X polarization (e.g., 16 samples×4 sub-carriers carrying data on the X polarization) and 64 samples on the Y polarization (e.g., 16 samples×4 sub-carriers carrying data on the Y polarization), for a total of 128 samples per clock cycle. Each sample may include a symbol (e.g., with a phase value and an amplitude value).

In some implementations, FAPC 515 may compensate the frequency of the input signal(s) using a frequency estimate value (FreqEstVal) received from frequency estimate component (FE) 555, determined as described elsewhere herein.

Additionally, or alternatively, FAPC 515 may compensate a phase difference between the X polarization and the Y polarization for each sub-carrier using a first phase difference value (phiDiff_1, or $\phi_{diff1}$) received from PDE 560, determined as described elsewhere herein. In some implementations, the quantity of phiDiff_1 values received from PDE 560 may correspond to the quantity of sub-carriers. For example, PDE 560 is shown as providing four phiDiff_1 values to FAPC 515 (e.g., phiDiff_1[0], phiDiff_1[1], phiDiff_1[2], and phiDiff_1[3]), where the values of 0-3 correspond to the 4 sub-carriers of example implementation 600.

Additionally, or alternatively, FAPC 515 may compensate a phase difference between different sub-carriers using a second phase difference value (phiDiff_2, or $\phi_{diff2}$) received from PDE 560, determined as described elsewhere herein. In some implementations, the quantity of phiDiff_2 values received from PDE 560 may correspond to the quantity of sub-carriers. For example, PDE 560 is shown as providing four phiDiff_2 values to FAPC 515 (e.g., phiDiff_2[0], phiDiff_2[1], phiDiff_2[2], and phiDiff_2[3]), where the values of 0-3 correspond to the 4 sub-carriers of example implementation 600.

For each sub-carrier s, FAPC 515 may compensate a sample received via the sub-carrier, based on input received from FE 555 and PDE 560, as follows:

$$x'_s[n] = x_s[n] \times e^{-j[XCompValue_s[n]]}$$

$$y'_s[n] = y_s[n] \times e^{-j[YCompValue_s[n]]}$$

In the above equations, $x'_s[n]$ and $y'_s[n]$ may represent the frequency and phase compensated symbols, for the $n^{th}$ sample (or at time n) of sub-carrier s, calculated by FAPC 515 for the X polarization and the Y polarization, respectively. Furthermore, $x_s[n]$ and $y_s[n]$ may represent the input symbols before adjustment, e may represent Euler's number (e.g., the mathematical constant e≈2.71828), j may represent the imaginary component of the sample (e.g., the square root of −1), and $XCompValue_s[n]$ and $YCompValue_s[n]$ may represent X polarization and Y polarization compensation values, respectively, to be applied to the input symbols by FAPC 515. In some implementations, $XCompValue_s[n]$ and $YCompValue_s[n]$ may be represented as follows:

$$XCompValue_s[n] = \left(\int_{-\infty}^{n} FreqEstVal\right) + \frac{\phi_{diff1}[s]}{2} + \phi_{diff2}[s]$$

$$YCompValue_s[n] = \left(\int_{-\infty}^{n} FreqEstVal\right) - \frac{\phi_{diff1}[s]}{2} + \phi_{diff2}[s]$$

In the above equations, FreqEstVal may represent the frequency estimate value received from FE 555, $\phi_{diff1}$ may represent the first phase difference value received from PDE 560, and $\phi_{diff2}$ may represent the second phase difference value received from PDE 560. As used herein, a frequency compensation value may refer to the frequency estimate value (FreqEstVal), an integral of the frequency estimate value (e.g., from $n_{initial}$ to $n_{final}$, such as from negative infinity to n), or the like. As used herein, a phase compensation value may refer to the first phase difference value (e.g., $\phi_{diff1}$), the second phase difference value (e.g., $\phi_{diff2}$), a mathematical combination of the first phase difference value and the second phase difference value $$\left(e.g., \frac{\phi_{diff1}[s]}{2} + \phi_{diff2}[s]\right),$$

or the like.

As shown in FIG. 6, FAPC 515 may provide $x'_s[n]$ and $y'_s[n]$ to phase test component 520. FAPC 515 may calculate these symbols for every sub-carrier s, and for every input sample n. As further shown in FIG. 6, FAPC 515 may provide $XCompValue_s[n]$ and $YCompValue_s[n]$ to phase ramp component 540.

As indicated above, FIG. 6 is provided merely as an example. Other examples are possible and may differ from what was described with regard to FIG. 6. For example, FAPC 515 may perform additional operations, fewer operations, or different operations than those described in connection with FIG. 6.

Figure 7:
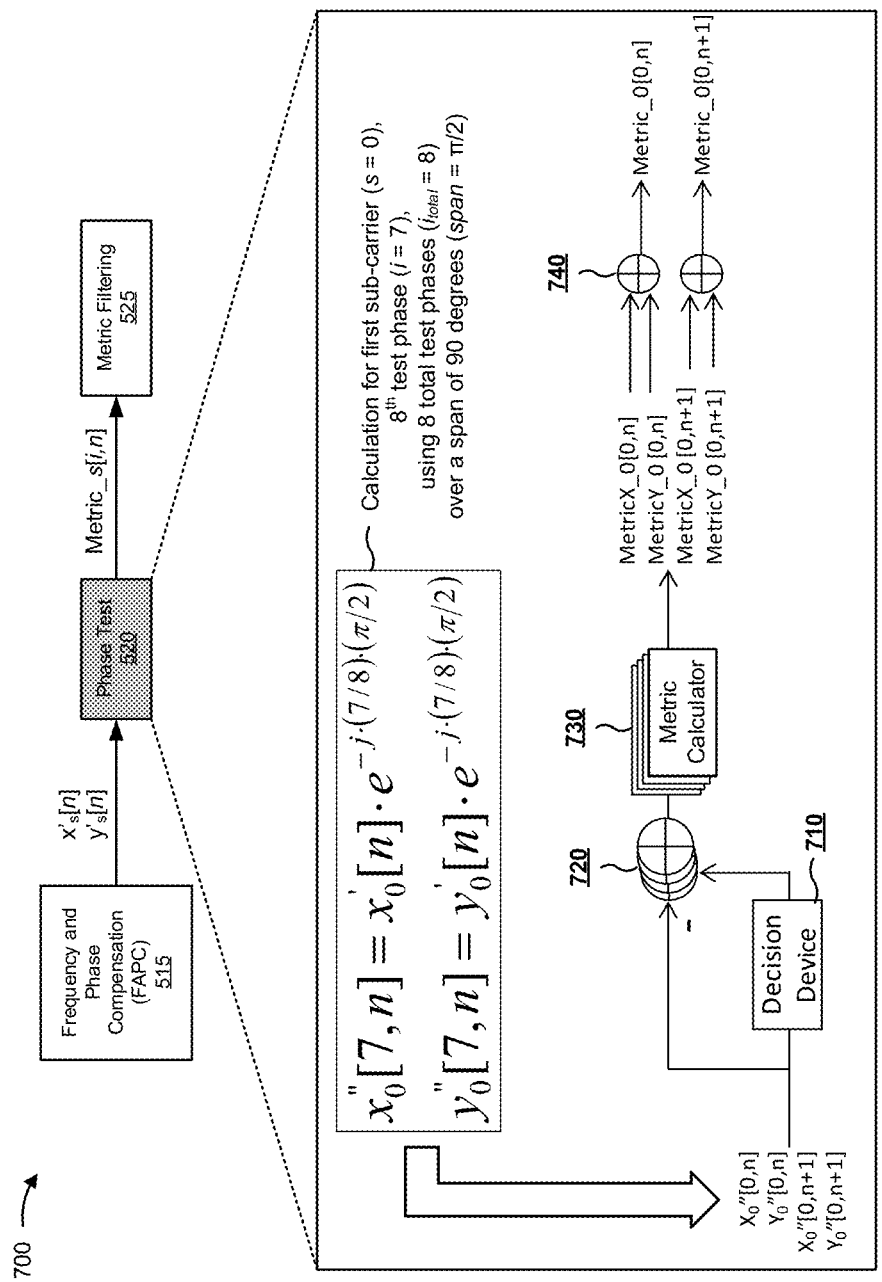

FIG. 7 is a diagram of an example implementation 700 relating to operations performed by phase test component (PT) 520. As described herein in connection with FIG. 6, PT 520 may receive phase and frequency compensated symbols $x'_s[n]$ and $y'_s[n]$ from FAPC 515. PT 520 may apply test phases to each received symbol (sample) and may calculate an error value associated with each test phase. The quantity of test phases and the span of the test phases may be configurable. As an example, assume that PT 520 uses 8 test phases. When performing carrier recovery for modulation formats that have 90 degree phase symmetry, PT 520 may use test phases that span 90 degrees. For example, when using 8 test phases that span 90 degrees, PT 520 may evenly space the test phases by using values of 0° (or 90°), 11.25°, 22.5°, 33.75°, 45°, 56.25°, 67.5°, and 78.75°. As another example, when using 8 test phases that span 180 degrees, PT 520 may evenly space the test phases by using values of 0° (or 180°), 22.5°, 45°, 67.5°, 90°, 112.5°, 135°, and 157.5°.

PT 520 may apply a test phase to a received sample as follows:

$$x''_s[i, n] = x'_s[n] \times e^{-j \times \left(\frac{i}{i_{total}}\right) \times (span)}$$

$$y''_s[i, n] = y'_s[n] \times e^{-j \times \left(\frac{i}{i_{total}}\right) \times (span)}$$

In the above equations, $x''_s[i, n]$ and $y''_s[i,n]$ may represent the test phase compensated symbols, for the $n^{th}$ sample (or at time n) of sub-carrier s when test phase i is applied, calculated by PT 520 for the X polarization and the Y polarization, respectively. Furthermore, $x'_s[n]$ and $y'_s[n]$ may represent the phase and frequency compensated symbols received from FAPC 515, e may represent Euler's number, j may represent the imaginary component of the sample, $i_{total}$ may represent the total quantity of test phases, and span may represent the span of the test phases. As an example, using 8 test phases that span 90 degrees, PT 520 may set span equal to π/2 radians (e.g., 90 degrees), and may set $i/i_{total}$ equal to 0/8 for the first test phase (e.g., test phase 0), to 1/8 for the second test phase (e.g., test phase 1), etc., and to 7/8 for the last test phase (e.g., test phase 7, where the 8 test phases are identified as test phases 0 through 7). Thus, every input sample, for a particular sub-carrier and polarization, will result in eight output samples (e.g., one for each test phase).

As further shown in FIG. 7, one or more test phase compensated symbols for each polarization may be provided to a decision device 710. Decision device 710 may determine, for each input symbol, a symbol in the constellation diagram with which the input symbol is most likely to correspond. For example, decision device 710 may use a maximum likelihood estimation (e.g., by determining the minimum Euclidean distance between the input symbol and a symbol in the constellation diagram). Decision device 710 may be configured based on a modulation format of the signal (e.g., QPSK, Block-4D-BPSK, 3QAM, 16QAM, etc.).

In some implementations, decision device 710 may use two or more consecutive samples (e.g., n, n+1) to determine a most likely symbol (e.g., when the modulation format is Block-4D-BPSK). PT 520 may input the test phase compensated symbol and the most likely symbol into a subtractor 720. Subtractor 720 may determine a difference between the test phase compensated symbol and the most likely symbol and may provide the difference to a metric calculator 730.

Metric calculator 730 may calculate an error value based on the difference. For example, metric calculator 730 may calculate a power of the error (e.g., a power of the difference), such as by squaring a difference of an in-phase component of the symbol (e.g., I), by squaring a difference of a quadrature component of the symbol (Q), and by summing the squares (e.g., $I^2+Q^2$). Metric calculator 730 may calculate a first error value for the X polarization and a second error value for the Y polarization. The error values calculated by metric calculator 730 for sub-carrier s and sample n using test phase i may be represented as MetricX_s[i,n] for the X polarization, and MetricY_s[i,n] for the Y polarization.

As further shown in FIG. 7, PT 520 may provide the X and Y error values to an adder 740. Adder 740 may combine the X and Y error values, for a particular sub-carrier s, test phase i, and sample n, to generate a combined error value for the particular sub-carrier s, test phase i, and sample n. The combined error value may be represented as Metric_s[i,n] (e.g., which may represent a sum of MetricX_s[i,n] and MetricY_s[i,n]). By combining the X and Y error values, adder 740 may reduce noise on the combined metric value. PT 520 may provide Metrics[i,n] to metric filtering component 525.

As indicated above, FIG. 7 is provided merely as an example. Other examples are possible and may differ from what was described with regard to FIG. 7. For example, PT 520 may perform additional operations, fewer operations, or different operations than those described in connection with FIG. 7.

Figure 8:
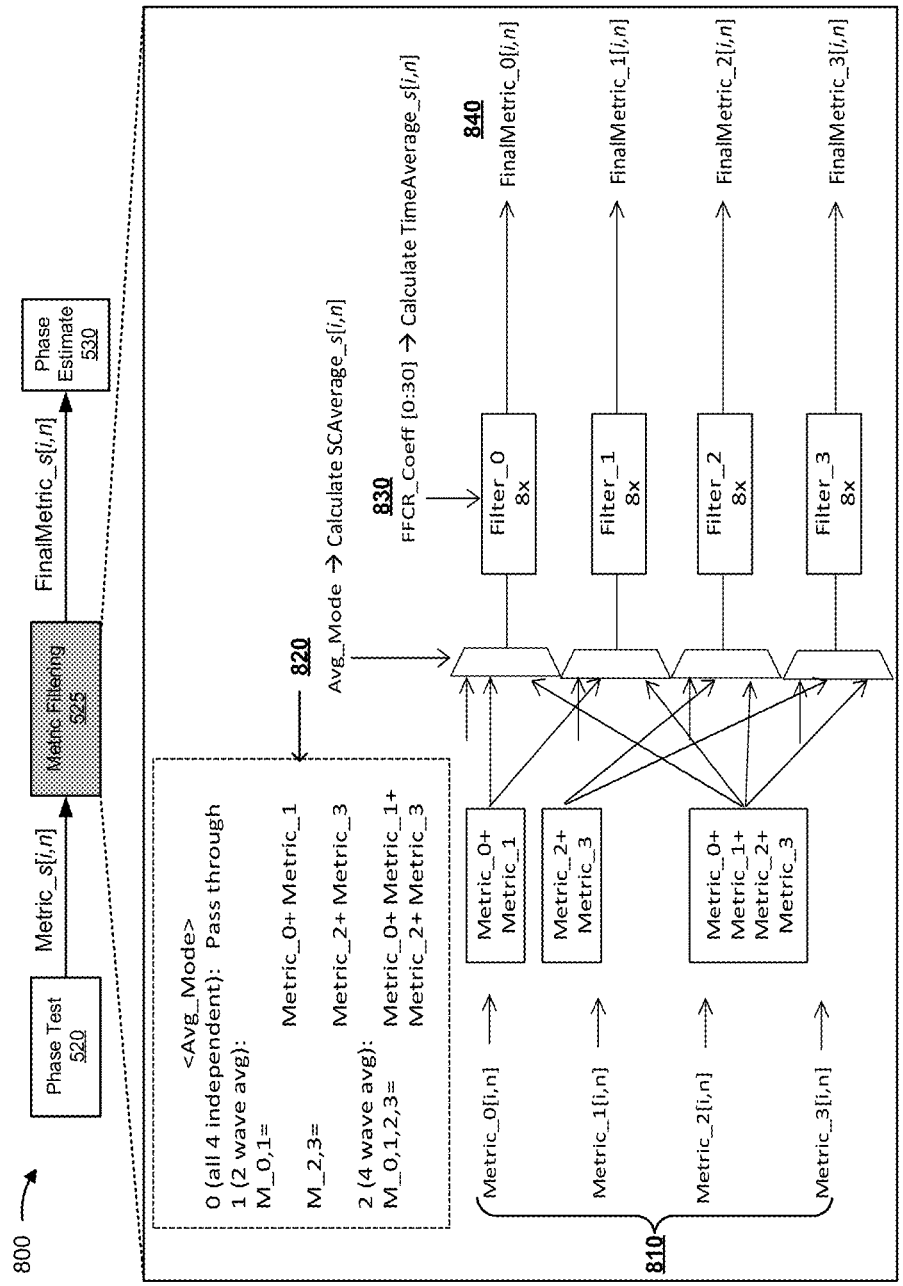

FIG. 8 is a diagram of an example implementation 800 relating to operations performed by phase metric filtering component (MF) 525. As described herein in connection with FIG. 7, MF 525 may receive combined metric values (e.g., Metric_s[i,n]) from PT 520. MF 525 may average combined metric values across multiple sub-carriers to generate a sub-carrier-averaged metric value for a particular sub-carrier s, test phase i, and sample n. Additionally, or alternatively, MF 525 may average combined metric values over time to generate a time-averaged metric value for a particular sub-carrier s, test phase i, and sample n. MF 525 may calculate the sub-carrier-averaged metric value and/or the time-averaged metric value to reduce an amount of noise in the metric value.

As an example, and as shown in FIG. 8, assume that an optical channel is divided into four subcarriers, labeled 0, 1, 2, and 3. As shown by reference number 810, assume that MF 525 receives a combined metric value Metric_s[i,n] for each of the four sub-carriers (e.g., Metric_0[i,n], Metric_1 [i,n], Metric_2[i,n], and Metric_3[i,n]). As shown by reference number 820, MF 525 may use an Avg_Mode indicator value to determine whether to calculate a sub-carrier-averaged metric value using multiple metric values for multiple respective sub-carriers (e.g., for a particular test phase and sample). For example, if the Avg_Mode value is equal to a first value (e.g., 0), then MF 525 may not calculate a sub-carrier-averaged metric value.

As another example, if the Avg_Mode value is equal to a second value (e.g., 1), then MF 525 may calculate a sub-carrier-averaged metric value (e.g., SCAverage) using metric values from two different sub-carriers. For example, MF 525 may calculate SCAverage_0[i,n] and SCAverage_1[i,n] by averaging Metric_0[i,n] and Metric_1[i,n]. Similarly, MF 525 may calculate SCAverage_2[i,n] and SCAverage_3[i,n] by averaging Metric_2[i,n] and Metric_3[i,n]. In some implementations, MF 525 may average other combinations of metric values (e.g., by averaging Metric_0 and Metric_2, Metric_0 and Metric_3, etc.)

As another example, if the Avg_Mode value is equal to a third value (e.g., 2), then MF 525 may calculate the sub-carrier-averaged metric value using metric values from four different sub-carriers. For example, MF 525 may calculate SCAverage_0[i,n], SCAverage_1[i,n], SCAverage_2[i,n], and SCAverage_3[i,n] by averaging Metric_0[i,n], Metric_1[i,n], Metric_2[i,n], and Metric_3[i,n].

In some implementations, Avg_Mode may be a different value than described above, and MF 525 may calculate the sub-carrier-averaged metric value using metric values for different quantities (e.g., 3, 5, etc.) of sub-carriers and/or may combine metric values for different combinations of sub-carriers. In some implementations, the value of Avg_Mode may be configurable (e.g., based on user input, based on a modulation format, based on a quantity of sub-carriers, etc.).

As shown by reference number 830, MF 525 may use an FFCR_Coeff[$n_{start}$, $n_{end}$] value to calculate a time-averaged metric value (e.g., TimeAverage_s[i,n]) using multiple metric values for multiple respective samples (e.g., for a particular test phase and sub-carrier). For example, MF 525 may calculate a time-averaged metric value over a particular quantity of samples (e.g., from $n_{start}$ to $n_{end}$). Additionally, or alternatively, MF 525 may calculate a time-weighted average (e.g., with more recent samples being weighted more heavily than less recent samples), or may use another averaging technique to calculate the time-averaged metric value.

As shown by reference number 840, MF 525 may generate and provide a final metric value, FinalMetric_s[i,n], to phase estimate component 530. In some implementations, the final metric value may be equal to the combined metric value (e.g., Metric_s[i,n]) received from PT 520. In some implementations, the final metric value may include a sub-carrier-averaged metric value (e.g., SCAverage_s[i,n]). In some implementations, the final metric value may include a time-averaged metric value (e.g., TimeAverage_s[i,n]). In some implementations, the final metric value may include a combination of sub-carrier-averaged metric values and time-averaged metric values. In this case, the time averaging and the sub-carrier averaging may be performed in any order.

As an example, MF 525 may calculate multiple sub-carrier-averaged metric values, for a particular sample, by averaging metric values for the particular sample over multiple sub-carriers. MF 525 may then calculate a time-averaged metric value, for the particular sample, by averaging multiple sub-carrier-averaged metric values over multiple samples.

As indicated above, FIG. 8 is provided merely as an example. Other examples are possible and may differ from what was described with regard to FIG. 8. For example, MF 525 may perform additional operations, fewer operations, or different operations than those described in connection with FIG. 8.

Figure 9A:
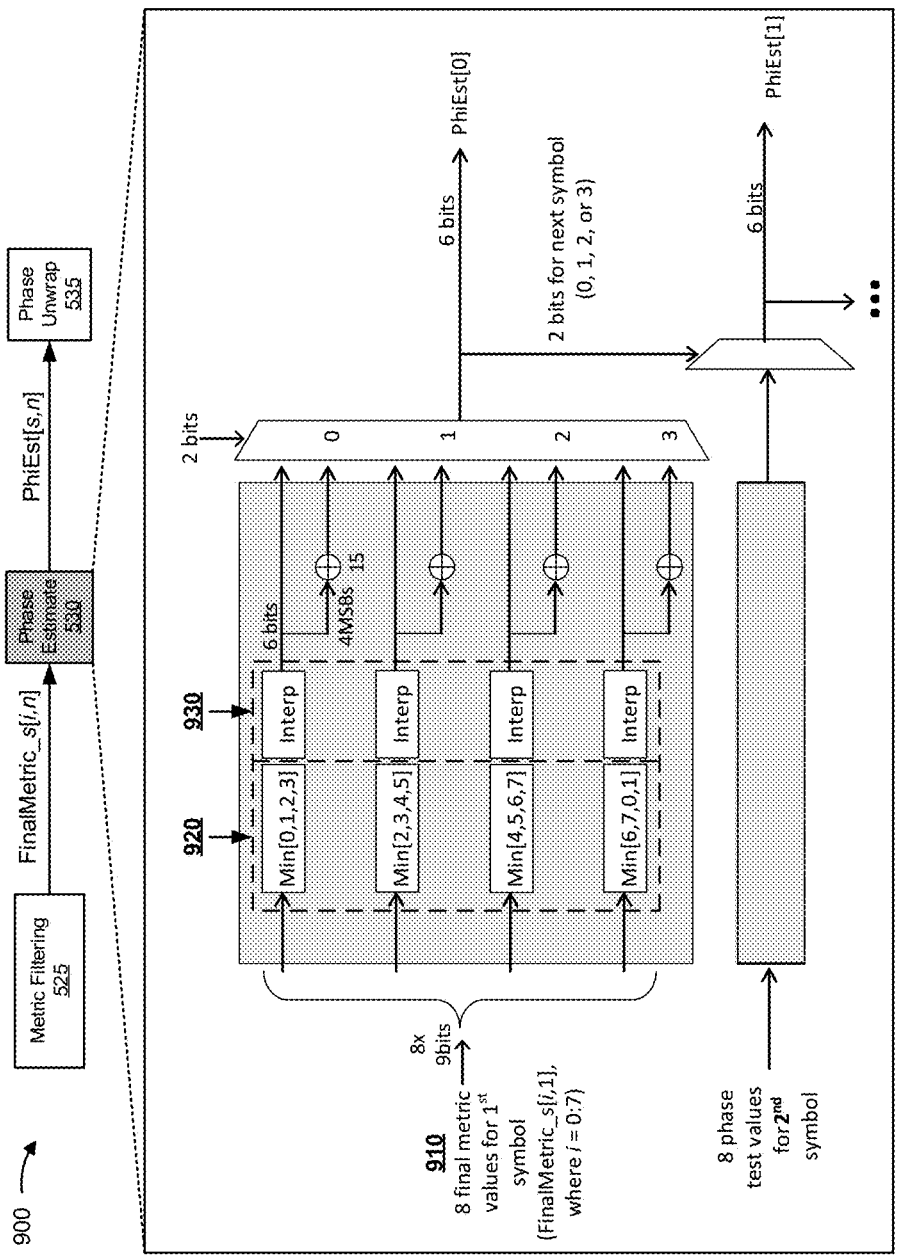
Figure 9B:
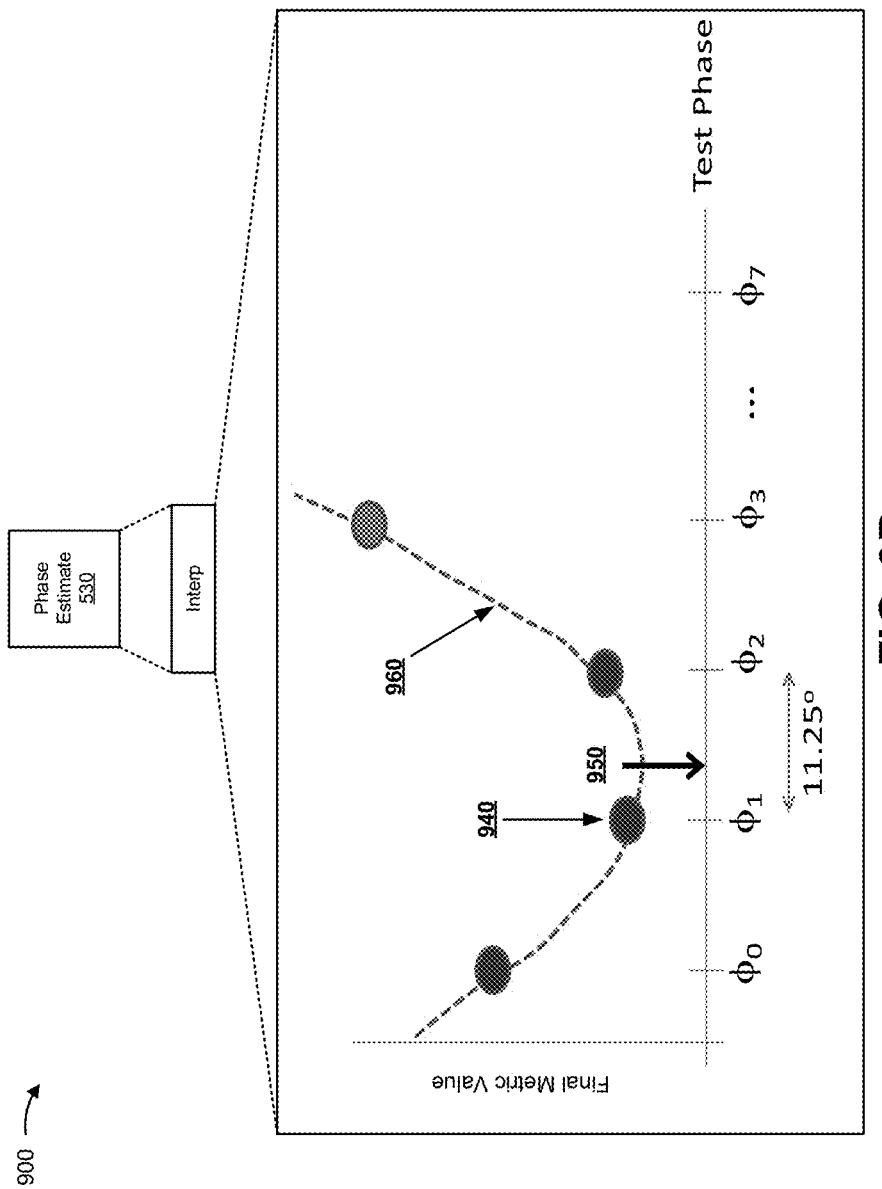

FIGS. 9A and 9B are diagrams of an example implementation 900 relating to operations performed by phase estimate component (PE) 530. As described herein in connection with FIG. 8, PE 530 may receive final metric values (e.g., FinalMetric_s[i,n]) from MF 525. PE 530 may determine a phase estimate (e.g., a most likely phase for a received symbol), for a particular sub-carrier s and sample n, using all of the final metric values FinalMetric_s[i,n] for each test phase i.

PE 530 may calculate a phase estimate PhiEst[s,n] for a first symbol (e.g., a first received symbol) by determining a minimum final metric value among all final metric values for different test phases applied to the first symbol. PE 530 may set the value of PhiEst[s,n] equal to the test phase value associated with the minimum final metric value. For example, PE 530 may determine the phase estimate PhiEst[s,0] for a first symbol n=0, where there are 8 test phases, by calculating the following:

$$\min_{i: 0 \to 7} \{\text{FinalMetric\_s}[i, 0]\}$$

PE 530 may then set the value of PhiEst[s,0] equal to the phase value of test phase i associated with the minimum final metric value. For example, when using 8 test phases that span 90 degrees, i={0, 1, 2, 3, 4, 5, 6, 7} may correspond to test phase values of {0°, 11.25°, 22.5°, 33.75°, 45°, 56.25°, 67.5°, 78.75° }. Thus, if i=2 generated the minimum metric value (e.g., FinalMetric_s[2,0]), then PE 530 may set PhiEst[s,0] equal to 22.5°.

For the second symbol (e.g., n=1), PE 530 may determine a minimum of fewer than all of the final metric values for the different test phases applied to the second symbol. For example, to calculate PhiEst[s,1], PE 530 may determine a minimum of four final metric values that center around PhiEst[s,0] (e.g., half of the eight total final metric values corresponding to the eight test phases). This avoids the issue of two minimum values discussed above in connection with FIGS. 1A and 1B. PE 530 may continue to determine phase estimate values in this manner, by calculating PhiEst[s,n+1] by determining a minimum of final metric values centered around PhiEst[s,n].

In some implementations, PE 530 may determine an interpolated phase estimate value to update PhiEst[s,n]. For example, PE 530 may interpolate PhiEst[s,n] using a quantity of final metric values centered around PhiEst[s,n].

As shown in FIG. 9A, and by reference number 910, assume that PE 530 receives eight final metric values associated with eight test phase values for a first symbol on a first sub-carrier. As shown by reference number 920, PE 530 may determine a minimum final metric value of four final metric values associated with four consecutive test phases, such as a minimum final metric value associated with test phase 0, 1, 2, or 3 (e.g., Min[0,1,2,3]), a minimum final metric value associated with test phase 2, 3, 4, or 5 (e.g., Min[2,3,4,5]), a minimum final metric value associated with test phase 4, 5, 6, or 7 (e.g., Min[4,5,6,7]), and a minimum final metric value associated with test phase 6, 7, 0, or 1 (e.g., Min[6,7,0,1]). Note that each of these calculations is centered around a different pair of test phases (e.g., 1-2, 3-4, 5-6, and 7-0).

As shown by reference number 930, once PE 530 determines a minimum final metric value from each group of four test phases, PE 530 may perform an interpolation (e.g., a parabolic interpolation) to estimate an interpolated phase value that corresponds to an actual minimum final metric value, as described in more detail in connection with FIG. 9B. PE 530 may compare the four interpolated phase values (e.g., one from each group of four test phases) to determine which one corresponds to a minimum final metric value, and may select the interpolated phase value that corresponds to the minimum final metric value as PhiEst[s,0]. PE 530 may provide PhiEst[s,n] to phase unwrap component 535.

Additionally, or alternatively, PE 530 may calculate a group indicator value (e.g., a two bit value of 0, 1, 2, or 3) to be used to select an interpolated phase value for the next symbol (e.g., to select a value for PhiEst[s,1]). For example, the output of the interpolation may be a six bit value, and PE 530 may provide the four most significant bits (MSBs) to an adder that combines the four MSBs with a value of 15 to produce a group indicator value of 0, 1, 2, or 3. When selecting PhiEst[s,n+1], PE 530 may use the group indicator value to select from the four interpolated phase values. For example, PE 530 may select the interpolated phase value determined from Min[0,1,2,3] when the group indicator value is equal to 0, may select the interpolated phase value determined from Min[2,3,4,5] when the group indicator value is equal to 1, may select the interpolated phase value determined from Min[4,5,6,7] when the group indicator value is equal to 2, and may select the interpolated phase value determined from Min[6,7,0,1] when the group indicator value is equal to 3. In this way, PE 530 may avoid the issue of selecting between two minimum values, as discussed above in connection with FIGS. 1A and 1B.

As shown in FIG. 9B, PE 530 may perform an interpolation (e.g., a parabolic interpolation) to estimate an interpolated phase value that corresponds to an actual minimum final metric value. FIG. 9B shows a plot of test phases 0, 1, 2, and 3, shown as $\phi_0$, $\phi_1$, $\phi_2$, and $\phi_3$ (e.g., corresponding to 0°, 11.25°, 22.5°, and 33.75°, respectively), and a corresponding final metric value associated with each test phase. This plot may correspond to an interpolation performed after determining Min[0,1,2,3], shown in FIG. 9A.

As shown by reference number 940, assume that test phase 1 corresponds to a minimum final metric value, as compared to test phases 0, 2, and 3. However, as shown by reference number 950, the actual minimum final metric value is associated with a phase value somewhere between the phase values of test phases 1 and 2 (e.g., between 11.25° and 22.5°). PE 530 may use multiple test phase values and the corresponding final metric values to interpolate a function that relates a phase value to a final metric value, as shown by reference number 960. As an example, PE 530 may use the test phase associated with the minimum final metric value (e.g., $\phi_1$) and the two test phases on either side of that test phase (e.g., $\phi_0$ and $\phi_2$), to interpolate the function. As another example, PE 530 may use all four test phase values and the corresponding final metric values to interpolate the function. PE 530 may use the function to determine an interpolated phase value that corresponds to the minimum final metric value of the function.

As indicated above, FIGS. 9A and 9B are provided merely as an example. Other examples are possible and may differ from what was described with regard to FIGS. 9A and 9B. For example, PE 530 may perform additional operations, fewer operations, or different operations than those described in connection with FIGS. 9A and 9B.

Figure 10:
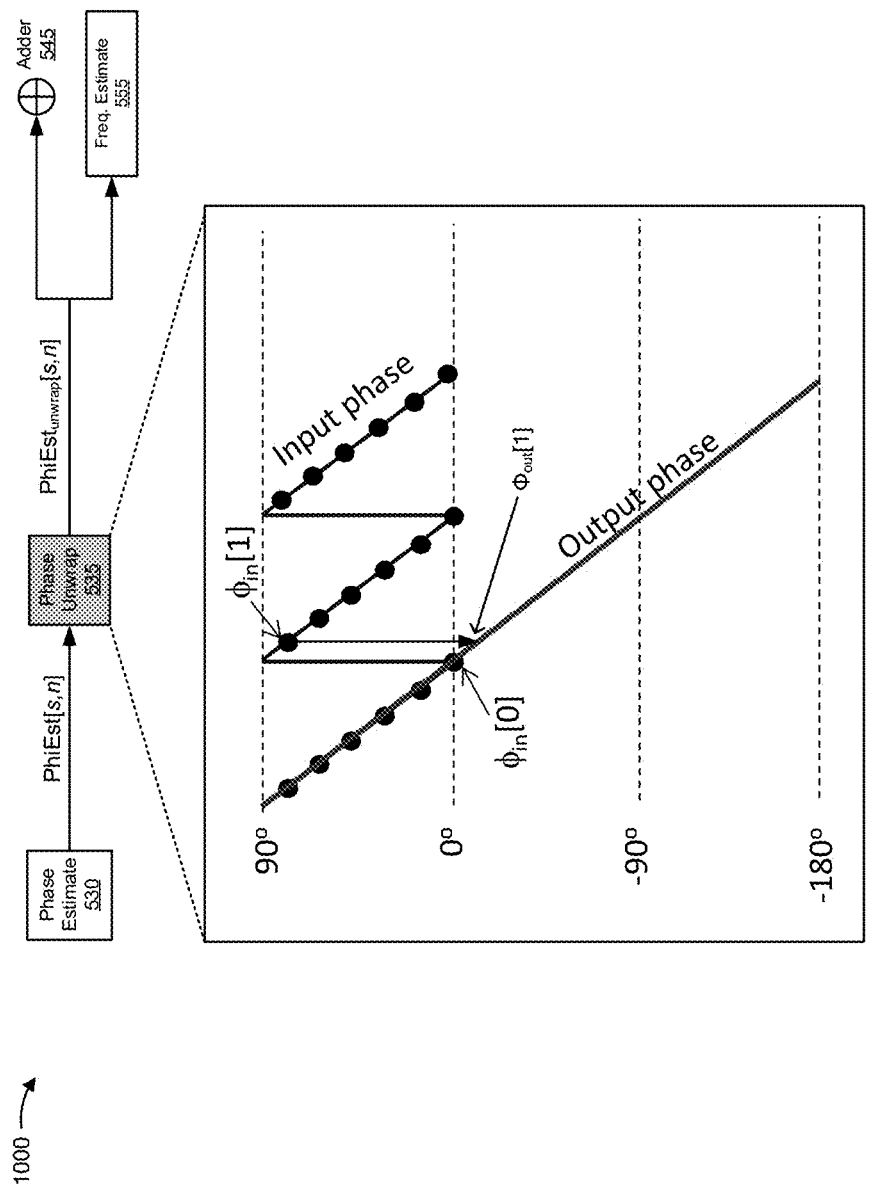

FIG. 10 is a diagram of an example implementation 1000 relating to operations performed by phase unwrap component (PU) 535. As described herein in connection with FIGS. 9A and 9B, PU 535 may receive a phase estimate value PhiEst[s,n] from PE 530. The value of PhiEst[s,n] may include a value between 0° and 90° for a modulation format with 90 degree symmetry, a value between 0° and 180° for a modulation format with 180 degree symmetry, etc. However, the actual phase value of a symbol may include a value between 0° and 360°. PU 535 may convert a received phase estimate value (e.g., PhiEst[s,n]) to an unwrapped phase estimate value (e.g., PhiEst$_{unwrap}$[s,n]) between 0° and 360°.

PU 535 may determine the actual phase value by calculating a phase difference between consecutively-received phase estimate values, such as a first phase estimate value PhiEst[s,n] and a second phase estimate value PhiEst[s,n+1]). PU 535 may subtract the first phase estimate value from the second phase estimate value. If the result is less than a first threshold value, then PU 535 may add a value equal to the span of the test phases (e.g., 90 degrees, 180 degrees, etc.) to the second phase estimate value. If the result is greater than a second threshold value, then PU 535 may subtract a value equal to the span of the test phases from the second phase estimate value. PU 535 may provide the resulting unwrapped phase estimate value PhiEst$_{unwrap}$[s,n] to adder 545 and frequency estimate component 555.

As an example, and as shown in FIG. 10, assume that PhiEst[s,0], shown in FIG. 10 as $\phi_{in}$[0], is equal to 0°, and that PhiEst[s,1], shown in FIG. 10 as $\phi_{in}$[1], is equal to 85°. Assume that PU 535 determines that $\phi_{in}$[1]−$\phi_{in}$[0] is equal to a result of 85°, which is greater than a threshold value of 45° (e.g., half the distance between 0° and a positive span of 90°). Thus, PU 535 calculates PhiEst$_{unwrap}$[s,1], shown in FIG. 10 as $\phi_{out}$[1], as $\phi_{in}$[1]−90°=−5°.

As another example, assume that $\phi_{in}$[0] is equal to 90°, and that $\phi_{in}$[1] is equal to 5°. Assume that PU 535 determines that $\phi_{in}$[1]−$\phi_{in}$[0] is equal to a result of −85°, which is less than a threshold value of −45° (e.g., half the distance between 0° and a negative span of −90°). Thus, PU 535 calculates $\phi_{out}$[1]=$\phi_{in}$[1]+90°=95°. In this way, PU 535 may unwrap received phase values along a full phase cycle of 360°.

As indicated above, FIG. 10 is provided merely as an example. Other examples are possible and may differ from what was described with regard to FIG. 10. For example, PU 535 may perform additional operations, fewer operations, or different operations than those described in connection with FIG. 10.

Figure 11:
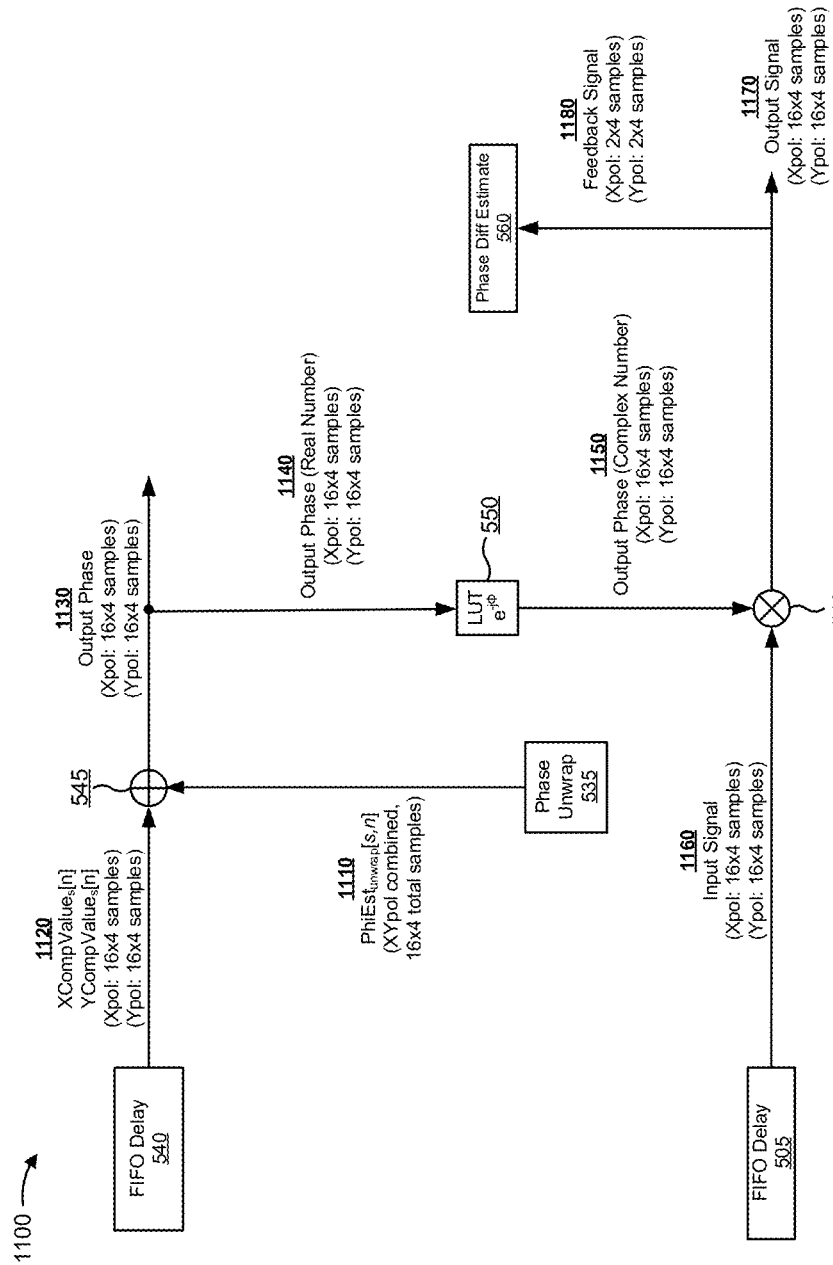

FIG. 11 is a diagram of an example implementation 1100 relating to operations performed by adder 545, lookup table component (LUT) 550, and multiplier 510. As described herein in connection with FIG. 10, and as shown by reference number 1110, adder 545 may receive an unwrapped phase estimate value PhiEstunwrap[s,n] from PU 535. The unwrapped phase estimate value may be a value that combines information determined based on the X polarization and the Y polarization. In example implementation 1100, assume that CRC 460 processes 16 samples per clock cycle, and that an optical channel that provides input to CRC 460 includes 4 sub-carriers.

As shown by reference number 1120, adder 545 may also receive a phase and frequency compensation value from FIFO Delay 540. For example, adder 545 may receive a phase and frequency compensation value for the X polarization (e.g., XCompValues[n]) and a phase and frequency compensation value for the Y polarization (e.g., YCompValues[n]). FIFO Delay 540 may delay providing the compensation values to adder 545 to coincide with the unwrapped phase estimate value being provided to adder 545. In this way, adder 545 may properly combine the compensation values and the unwrapped phase estimate value (e.g., with appropriate timing). As shown by reference number 1130, adder 545 may combine (e.g., may sum) each phase and frequency compensation value with the phase estimate value to determine an output phase for each polarization (e.g., XCompValues[n]+PhiEstunwrap[s,n] for the X polarization, and YCompValues[n]+PhiEstunwrap[s,n] for the Y polarization). The output phases may be represented using a real number.

As shown by reference number 1140, LUT 550 may receive the real number output phases, and may convert the real number output phases to complex number output phases. For example, LUT 550 may use a lookup table to perform the conversion. As shown by reference number 1150, LUT 550 may provide the complex number output phases to multiplier 510. As shown by reference number 1160, multiplier 510 may also receive an input signal from FIFO Delay 505. For example, multiplier 510 may receive an input signal for the X polarization and an input signal for the Y polarization. FIFO Delay 540 may delay providing the input signal(s) to multiplier 510 to coincide with the complex number output phase value being provided to multiplier 510. In this way, multiplier 510 may properly combine the input signals and the complex number output phase values (e.g., with appropriate timing). Multiplier 510 may combine (e.g., may multiply, rotate, etc.) each input signal value with a corresponding complex number output phase to determine a carrier-recovered output signal for each polarization.

As shown by reference number 1170, multiplier 510 may output the output signal (e.g., to a symbol decoder). Additionally, or alternatively, as shown by reference number 1180, multiplier 510 may provide a feedback signal via a feedback loop to another component of CRC 460 (e.g., PDE 560). The feedback signal may be the same as the output signal, in some implementations. In some implementations, multiplier 510 may provide the feedback signal at a different rate than the output signal. For example, multiplier 510 may generate 16 output signals per sub-carrier per clock cycle, and may generate 2 feedback signals per sub-carrier per clock cycle, as shown.

As indicated above, FIG. 11 is provided merely as an example. Other examples are possible and may differ from what was described with regard to FIG. 11. For example, adder 545, LUT 550, and/or multiplier 510 may perform additional operations, fewer operations, or different operations than those described in connection with FIG. 11.

Figure 12:
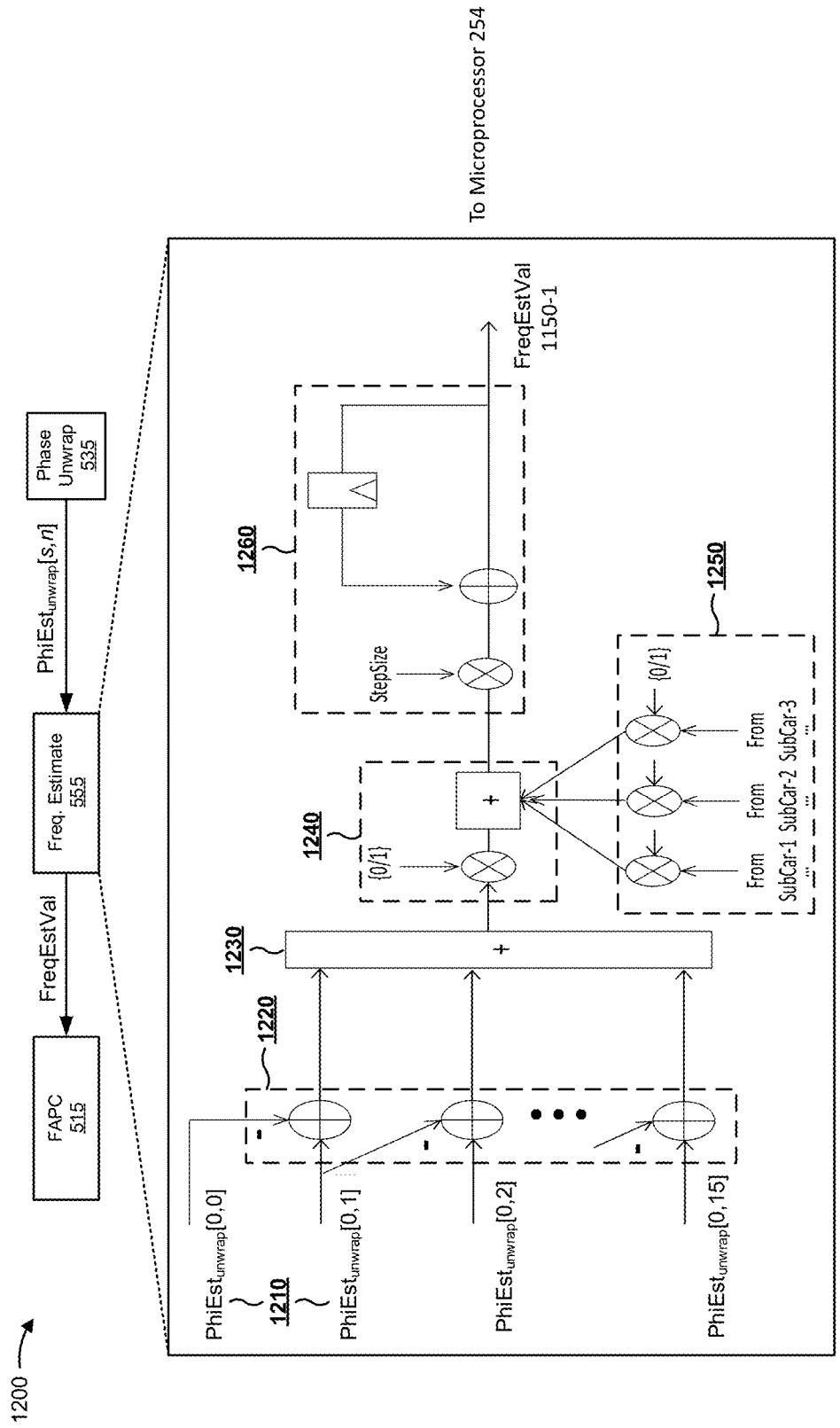

FIG. 12 is a diagram of an example implementation 1200 relating to operations performed by frequency estimate component (FE) 555. As described herein in connection with FIG. 10, FE 555 may receive a set of unwrapped phase estimate values PhiEstunwrap[s,n] from PU 535. FE 555 may use the set of unwrapped phase estimate values to calculate a frequency estimate value FreqEstVal (e.g., to be used by FAPC 515 to compensate a frequency value of an input signal).

As an example, and as shown by reference number 1210, assume that FE 555 receives 16 samples (e.g., per clock cycle), labeled 0 through 15, on the first sub-carrier (e.g., s=0). As shown by reference number 1220, FE 555 may calculate a difference between each pair of adjacent samples (e.g., samples n={0,1}, n={1,2}, n={2,3}, . . . , n={14,15}). As shown by reference number 1230, FE 555 may sum all of these difference values to calculate a frequency compensation error introduced by processing performed by components 515-535.

As shown by reference number 1240, FE 555 may optionally average the frequency compensation error across multiple sub-carriers. As shown by reference number 1250, FE 555 may be configured to include or exclude a sub-carrier from the averaging operation. FE 555 may perform processing similar to that shown by reference numbers 1210-1230 for each sub-carrier, and may average the frequency compensation error across two or more sub-carriers.

As shown by reference number 1260, FE 555 may input the frequency compensation error (or the average frequency compensation error) into a digital integrator to form a first order feedback loop to control the error. FE 555 may control the feedback loop (e.g., an amount of bandwidth used by the feedback loop) using a step size value. FE 555 may output the frequency compensation error (or the average frequency compensation error) to FAPC 515 as the frequency estimate value FreqEstVal, which is noted above as signal 1150-1 supplied to control circuit 254-1.

As indicated above, FIG. 12 is provided merely as an example. Other examples are possible and may differ from what was described with regard to FIG. 12. For example, FE 555 may perform additional operations, fewer operations, or different operations than those described in connection with FIG. 12.

As noted above, signal 1150-1 may be employed to control a frequency of laser 299. Such laser frequency, in one example, may be equal to that of the primary node laser, i.e., frequency f_laser. Alternatively, control circuit 254-1, based on signal 1150-1 may supply a signal to frequency adjusting circuit 252 so that the frequency of light output from laser 299-1 is offset from the frequency f_laser.

As further noted above, light output laser 299-1 is supplied to splitter 299-2 via tap 251, such that a portion of such light is provided to Tx D/A and Optica block 901. Such light is modulated, as described above, to provide a plurality of subcarriers based on the outputs of Tx DSP 902, which, in turn, are based on data D1 to D-n.

Tx DSP 902 Tx D/A and Optical Block 901 will next be described with reference to FIGS. 13 and 14, respectively. As shown FIG. 13, each such data stream D1-Dn is supplied to a respective one of forward error correction (FEC) encoders 1002-0 to 1002-n. FEC encoders 1002-0 to 1002-n carry out forward error correction coding on a corresponding one of the switch outputs, such as, by adding parity bits to the received data. FEC encoders 1002-0 to 1002-n may also provide timing skew between the subcarriers to correct for skew introduced during transmission over one or more optical fibers. In addition, FEC encoders 1002-0 to 1002-n may interleave the received data.

Each of FEC encoders 1002-0 to 1002-n provides an output to a corresponding one of multiple bits to symbol circuits, 1004-0 to 1004-n (collectively referred to herein as "1004"). Each of bits to symbol circuits 1004 may map the encoded bits to symbols on a complex plane. For example, bits to symbol circuits 1004 may map four bits to a symbol in a dual-polarization Quadrature Phase Shift Keying (QPSK) or and m-quadrature amplitude modulation (m-QAM, m being a positive integer) constellation, such as 8-QAM, 16-QAM, and 64-QAM. Each of bits to symbol circuits 1004 provides first symbols, having the complex representation XI+j*XQ, associated with a respective one of the data input, such as D0, to DSP portion 1003. Data indicative of such first symbols may carried by the X polarization component of each subcarrier.

Each of bits to symbol circuits 1004 may further provide second symbols having the complex representation YI+j*YQ, also associated with a corresponding one of data inputs D0 to Dn. Data indicative of such second symbols, however, is carried by the Y polarization component of each of a corresponding one of subcarriers output from node 112.

Figure 13:
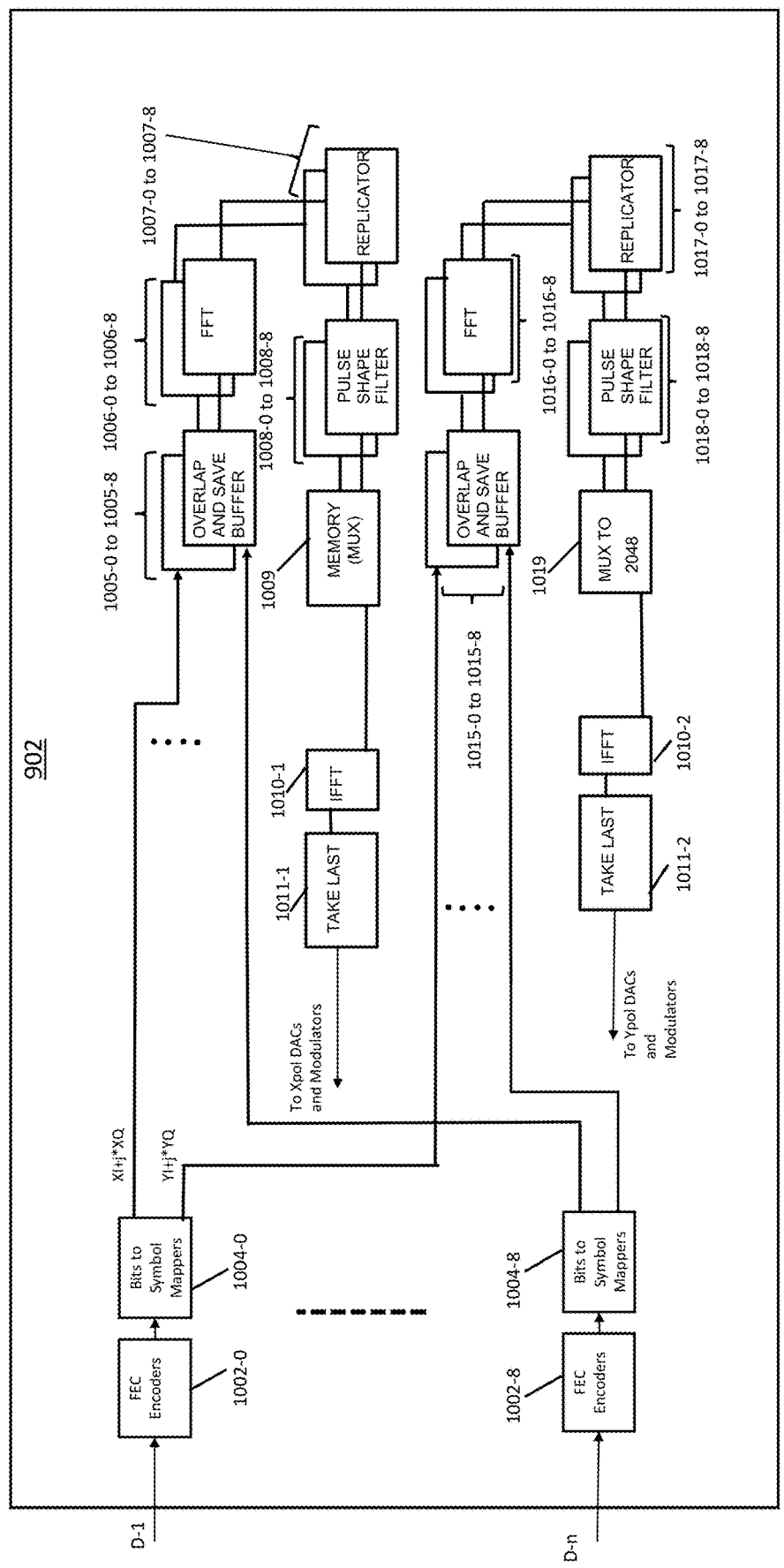
FIG. 13 shows a block diagram of a secondary node transmitter digital signal processor consistent with the present disclosure.

As further shown in FIG. 13, each of the first symbols output from each of bits to symbol circuits 1004 is supplied to a respective one of first overlap and save buffers 1005-0 to 1005-n (collectively referred to herein as overlap and save buffers 1005) that may buffer 256 symbols, for example. Each of overlap and save buffers 1005 may receive 128 of the first symbols or another number of such symbols at a time from a corresponding one of bits to symbol circuits 1004. Thus, overlap and save buffers 1005 may combine 128 new symbols from bits to symbol circuits 1004, with the previous 128 symbols received from bits-to-symbol circuits 1004.

Each overlap and save buffer 1005 supplies an output, which is in the time domain, to a corresponding one of fast Fourier Transform (FFT) circuits 1006-0 to 1006-n (collectively referred to as "FFTs 1006"). In one example, the output includes 256 symbols or another number of symbols. Each of FFTs 1006 converts the received symbols to the frequency domain using or based on, for example, a fast Fourier transform. Each of FFTs 1006 may include 256 memories or registers, also referred to as frequency bins or points, that store frequency components associated with the input symbols. Each of replicator components 1007-0 to 1007-n may replicate the 256 frequency components associated with of FFTs 1006 and store such components in 512 or another number of frequency bins (e.g., for T/2 based filtering of the subcarrier) in a respective one of the plurality of replicator components. Such replication may increase the sample rate. In addition, replicator components or circuits 1007-0 to 1007-n may arrange or align the contents of the frequency bins to fall within the bandwidths associated with pulse shaped filter circuits 1008-0 to 1008-n described below.

Each of pulse shape filter circuits 1008-0 to 1008-n may apply a pulse shaping filter to the data stored in the 512 frequency bins of a respective one of the plurality of replicator components 1007-0 to 1007-n to thereby provide a respective one of multiple filtered outputs, which are multiplexed and subject to an inverse FFT, as described below. Pulse shape filter circuits 1008-1 to 1008-n calculate the transitions between the symbols and the desired subcarrier spectrum so that the subcarriers can be spectrally packed together for transmission, e.g., with a close frequency separation. Pulse shape filter circuits 1008-0 to 1008-n may also be used to introduce timing skew between the subcarriers to correct for timing skew induced by links between nodes shown in FIG. 1, for example. Memory component 1009, which may include a multiplexer circuit or memory, may receive the filtered outputs from pulse shape filter circuits 1008-0 to 1008-n, and multiplex or combine such outputs together to form an element vector.

The output of memory 1009 is fed to IFFT circuit or component 1010-1. IFFT circuit 1010-1 may receive the element vector and provide a corresponding time domain signal or data based on an inverse fast Fourier transform (IFFT). In one example, the time domain signal may have a rate of 64 G Sample/s. Take last buffer or memory circuit 1011-1 may select the last 1024 or another number of samples from an output of IFFT component or circuit 1010-1 and supply the samples at 64 Gsamples/second, for example, to digital-to-analog converters (DACs) 904-1 and 904-2, as shown in FIG. 14.

As further shown in FIG. 13, each of bits to symbol circuits 1004-0 to 1004-$n$ outputs a corresponding one of symbols indicative of data carried by the Y polarization component of the polarization multiplexed modulated optical signal output on optical communication path or fiber 115. As further noted above, these symbols may have the complex representation YI+j*YQ. Each such symbol may be processed by a respective one of overlap and save buffers 1015-0 to 1015-$n$, a respective one of FFT circuits 1016-0 to 1016-$n$, a respective one of replicator components or circuits 1017-0 to 1017-$n$, pulse shape filter circuits 1018-0 to 1018-$n$, multiplexer or memory 1019. Moreover, the output of multiplexer or memory 1019 may be fed to IFFT 1010-2, and take last buffer or memory circuit 1011-2, to provide processed symbols having the representation YI+j*YQ in a manner similar to or the same as that discussed above in generating processed symbols XI+j*XQ output from take last circuit 1011-1. In addition, symbol components YI and YQ are provided to DACs 904-3 and 904-4, respectively (see FIG. 14).

While FIG. 13 shows Tx DSP 902 as including a particular quantity and arrangement of functional components, in some implementations, DSP 902 may include additional functional components, fewer functional components, different functional components, or differently arranged functional components. In addition, typically the number of overlap and save buffers, FFTs, replicator circuits, and pulse shape filters associated with the X component may be equal to the number of data inputs, and the number of such circuits associated with the Y component may also be equal to the number of switch outputs. However, in other examples, the number of data inputs may be different than the number of these circuits.

Figure 14:
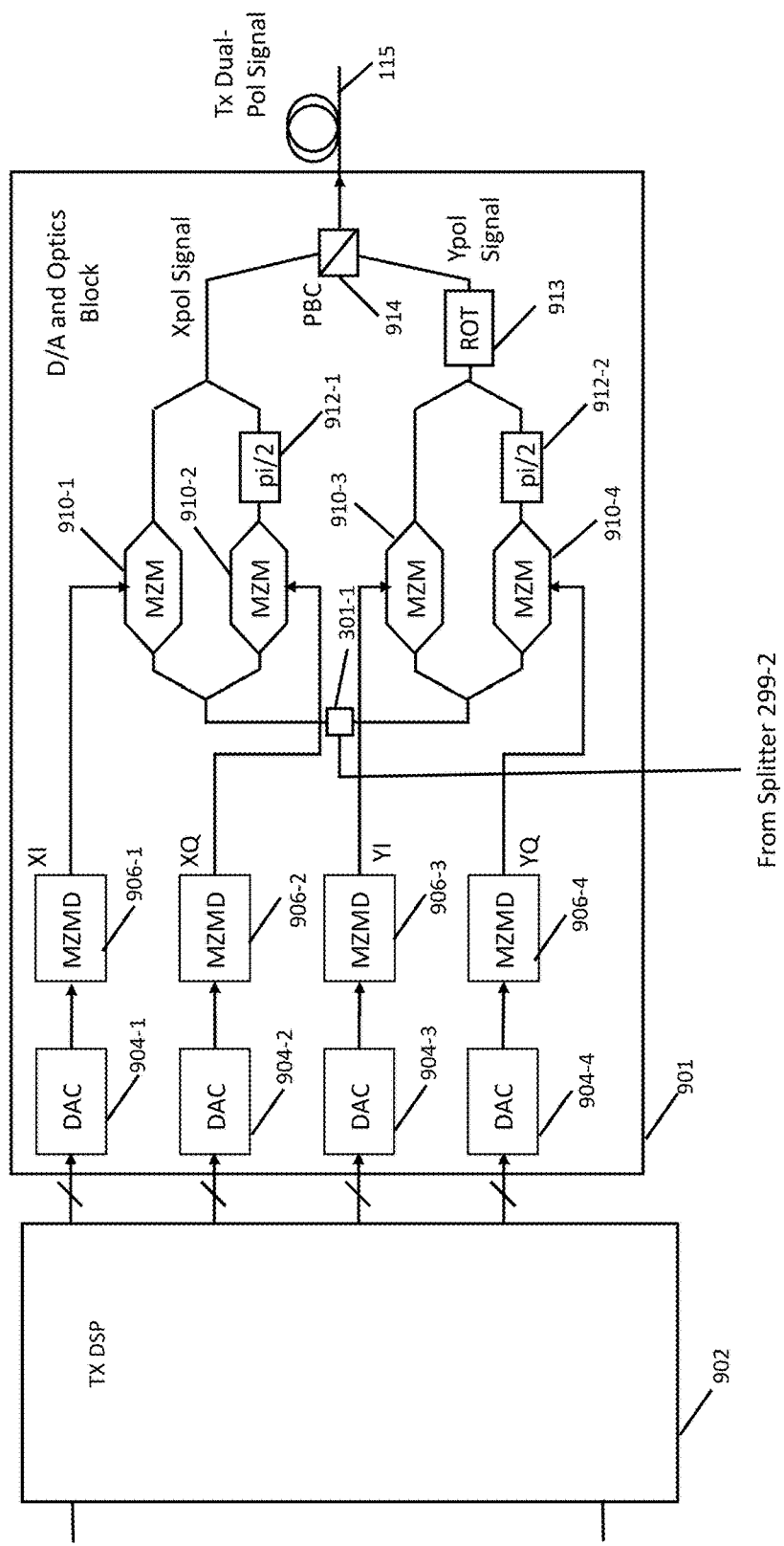
FIG. 14 illustrates a portion of a secondary node transmitter consistent with an aspect of the present disclosure.

Turning to FIG. 14, the above-noted DAC circuits 904-1 to 904-4 are provided in D/A and optics block 901 where such circuits convert digital signal received from DSP 902 into corresponding analog signals. D/A and optics block 901 also includes driver circuits 906-1 to 906-2 that receive the analog signals from DACs 904-1 to 904-4 and adjust the voltages or other characteristics thereof to provide drive signals to a corresponding one of modulators 910-1 to 910-4, as described below.

D/A and optics block 901 further includes modulators 910-1 to 910-4, each of which may be, for example, a Mach-Zehnder modulator (MZM) that modulates the phase and/or amplitude of the light output from laser 908. As further shown in FIG. 14, a portion of light from laser 299-1 output from splitter 299-2 is provided to splitter 301-1, which further splits the light, such that a first part of portion of the light supplied form splitter 301-1 is supplied to a first MZM pairing, including MZMs 910-1 and 910-2, and a second part of the light supplied from splitter 301-1 is supplied to a second MZM pairing, including MZMs 910-3 and 910-4. The first portion of the light supplied from splitter 301-1 is split further into third and fourth portions, such that the third portion is modulated by MZM 910-1 to provide an in-phase (I) component of an X (or TE) polarization component of a modulated optical signal, and the fourth portion is modulated by MZM 910-2 and fed to phase shifter 912-1 to shift the phase of such light by 90 degrees in order to provide a quadrature (Q) component of the X polarization component of the modulated optical signal. Similarly, the second portion of the light supplied from splitter 301-1 is further split into fifth and sixth portions, such that the fifth portion is modulated by MZM 910-3 to provide an I component of a Y (or TM) polarization component of the modulated optical signal, and the sixth portion is modulated by MZM 910-4 and fed to phase shifter 912-2 to shift the phase of such light by 90 degrees to provide a Q component of the Y polarization component of the modulated optical signal. As used herein, a "modulator" may refer to each modulator, such as MZMs 910-1 to 910-4, individually, or refer to such modulators collectively. For example, MZMs 910-1 to 910-4 may collectively be referred to as a "nested" Mach-Zehnder modulator.

The optical outputs of MZMs 910-1 and 910-2 are combined to provide an X polarized optical signal including I and Q components and are fed to a polarization beam combiner (PBC) 914, which, in one example, is provided in block 901. In addition, the outputs of MZMs 910-3 and 910-4 are combined to provide an optical signal that is fed to polarization rotator 913, that rotates the polarization of such optical signal to provide a modulated optical signal having a Y (or TM) polarization. The Y polarized modulated optical signal also is provided to PBC 914, which combines the X and Y polarized modulated optical signals to provide a polarization multiplexed ("dual-pol") modulated optical signal, including one or more subcarriers, onto optical fiber 916, for example, which may be included as a segment of optical fiber in optical communication path 115.

Examples of power spectral density (PSD) plots associated with subcarriers received by primary node 110 (FIGS. 15$a$ and 15$b$) and output from primary node 110 (FIGS. 15$c$ and 15$d$) will next be described.

In FIG. 15$a$, optical subcarriers SC1' and SC2', for example, are generated in a manner similar to that described above by secondary nodes 112-$j$ and 112-$k$, respectively. Optical subcarriers SC1' and SC2', along with other optical subcarriers, are transmitted to and received by primary node 110. Each subcarrier has a corresponding frequency, such that subcarriers SC1' and SC2' have frequencies f1 and f2, respectively. In this example, although primary node 110 may be capable of receiving and processing 16 subcarriers, less than 16 subcarriers are transmitted from secondary nodes 112 to primary node 110. In FIG. 15$b$, however, all 16 subcarriers are transmitted to primary node 110 from secondary nodes 112. Such subcarriers including subcarriers SC1', SC2', and SC3' having frequencies f1, f2, and f3, respectively.

FIG. 15$c$ shows a PSD plot of 16 subcarriers (SC1 to SC16) output from primary node 110, which in this example is a maximum number of subcarriers that may be supplied by primary node 110. In FIG. 15$d$, groups of subcarriers, SCG1, SCG2, and SCG3 are output from primary node 110. In the example shown in FIG. 15$d$, each such group includes four subcarriers.

FIG. 15$e$ shows an example of a PSD plot of optical subcarriers received by one of secondary nodes 112. In particular, the optical subcarriers shown in FIG. 15$c$ are received by one of secondary nodes 112. In another example shown in FIG. 15$f$, one of the subcarrier groups shown in FIG. 15$d$, e.g., subcarrier group SCG2 including subcarriers SC3 and SC4 having frequencies f3 and f4, respectively, is received by one of secondary nodes 112.

As noted above, based on the received optical subcarriers, light output from the laser in the secondary node, e.g., laser 299-1, is "synchronized" for example, to the frequency of light output from laser 199-1 in the primary node. Put another way, the light output from laser 299-1 may be controlled to have the same or substantially the same frequency, fc, as the light output from laser 199-1 (in the above discussion fc is referred to as f_laser). Accordingly, optical subcarriers output from the secondary nodes have frequencies distributed about frequency fc, such that the subcarrier frequencies are offset from and have values that are either less than or greater than fc.

Figure 15B:
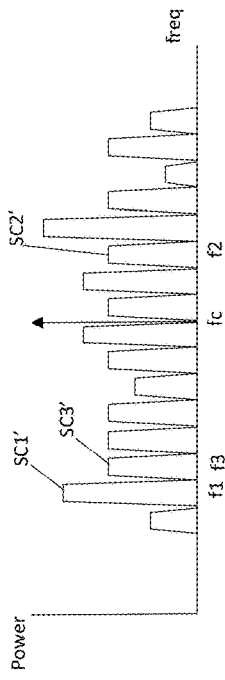
Figure 15D:
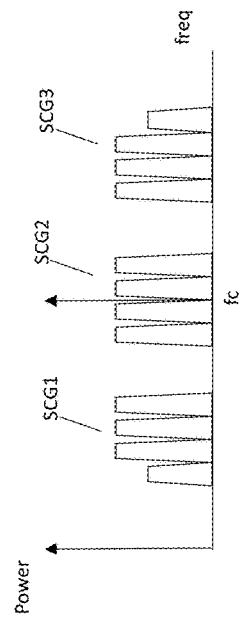
Figure 15A:
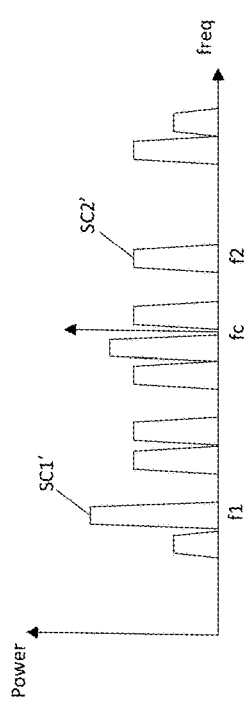
Figure 15C:
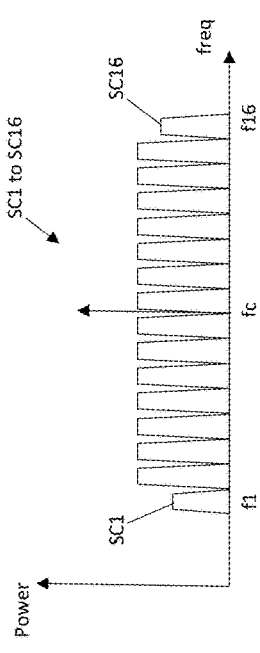

For example, as shown in FIG. 15g, subcarriers SC1' and SC3' have frequencies less than fc, whereas subcarriers SC2' and SC4' have frequencies greater than fc. Here, one of secondary nodes 112 is configured to output four subcarriers.

In FIG. 15h, two subcarriers, SC3' and SC2' are transmitted from one of secondary nodes 112, such that subcarrier SC3' has a frequency less than fc and subcarrier SC2' has a frequency greater than fc. In another example, one subcarrier SC2' is transmitted with a frequency greater than fc. In a further example, the frequency of each of subcarrier is offset by a fixed spectral spacing or a multiple of such fixed spectral spacing from frequency fc.

As noted above, the frequency of light output from laser 299-1 can synchronized or adjusted to be the same or approximate that of laser 199-1 based one or more received optical subcarriers from primary node 110. In particular, in the example noted above, frequency information or data indicative of one or more subcarriers received by the secondary node is output to frequency adjusting control circuit 254-1 from circuitry in carrier recovery component 460. Consistent with a further aspect of the present disclosure, and as discussed below with reference to FIGS. 16a-16d, such frequency information may be derived from the contents of frequency bins associated with FFTs 1210-1 and/or 1210-2 (see FIG. 4). FIG. 16a illustrates an example of such frequency bins or memories. In some implementations, additional bins, fewer bins, different bins or memories, or differently arranged bins are provided.

As noted above in connection with FIG. 4, outputs from overlap and save buffers 1205 are in the time domain, and such outputs are provided to FFTs 1210, which convert the received time domain data into frequency domain data. The FFTs supply the frequency domain data to corresponding bins, which, in this example, constitute a plurality of memories or memory locations, such as memory locations 1-17, as shown in FIG. 16a.

Each of frequency bins 1-18 corresponds to a particular frequency. If optical energy is present at a given frequency, the corresponding frequency bin stores a value. If little or no optical energy is present at a particular frequency, the corresponding frequency bin stores a relatively low value or a zero value. Those frequency bins 1-18 corresponding to frequencies associated with particular subcarriers, therefore, store frequency domain data values that are greater than the values stored in bins which are associated with, for example, gaps between subcarriers or frequencies lying outside the range of frequencies corresponding to particular subcarriers. Thus, the values stored in the memories or frequency bins 1-18 are indicative of the frequencies of the subcarriers included in the received modulated optical signal.

As shown in the example of FIG. 16b, each of frequency domain data values V2 to V4 is stored in a corresponding one of bins 2-4; each of frequency domain data values V6 to V8 is stored in a corresponding one of bins 6-8; each of frequency domain data values V10 to V12 is stored in a corresponding one of bins 10-12; and each of frequency domain data values V14 to V16 is stored in a corresponding one of bins 14-16. Each of frequency domain data values V2-V4, V6-V8, V10-V12, and V14-V16 is relatively high, and, is therefore indicative of the presence of optical energy at the frequencies associated with the bins in which these data values are stored. Bins 1, 5, 9, 13, and 17, however, store low frequency domain data values or values equal to zero and thus indicate an absence or reduced optical energy at the frequencies associated with bins 1, 5, 9, 13, and 17. Such bins storing low values are therefore indicative of gaps between subcarriers.

Based on the stored frequency domain data noted above, a power spectral density associated with the received subcarrier can be calculated. For example, as shown in the calculated PSD of FIG. 16c, frequencies including frequency f1' correspond to bins 2-4 storing data indicative of the presence of optical energy. Accordingly, frequency f1' associated with bin 3 and adjacent frequencies associated with bins 2 and 4 may be assigned to subcarrier SC1. In addition, frequency f3' associated with bin 7 and adjacent frequencies associated with bins 6 and 8 may be assigned to subcarrier SC3; frequency f2' associated with bin 11 and adjacent frequencies associated with bins 10 and 12 may be assigned to subcarrier SC2; and frequency f4' associated with bin 15 and adjacent frequencies associated with bins 14 and 16 may be assigned to subcarrier SC4.

In one implementation, once the frequencies associated with each subcarrier are determined and the gaps between subcarriers identified, the calculated laser frequency fc' may be determined at the secondary node. In the example shown in FIGS. 16a-16c, fc' may be determined to be the average frequency of the subcarrier central frequencies f1', f2', f3', and f4'. Other techniques may be employed to determine fc based on, for example, the number of subcarriers, the spectral width of each, and spectral gaps between each subcarrier, among other parameters.

For example, in another implementation, based on the number of subcarriers and expected number of gaps between adjacent ones of such subcarriers, a central spectral gap may be identified between frequencies associated with the innermost two subcarriers, such as subcarriers SC2 and SC3 (see FIG. 1c). Once the central gap is identified, the calculated fc' may be identified or determined to be the frequency in the middle of the central gap.

Once determined by the above-described methods, for example, the calculated PSD and fc' are compared to a predetermined PSD and fc associated with the preferred frequencies of subcarriers SC1 to SC4 and fc (see FIG. 16d). A difference between fc and fc' is then determined or calculated as a frequency offset. A signal indicative of this frequency offset is then provided, in one example, as signal 1150-1, as such signal is indicative of the frequency of the received modulated optical input to the secondary node.

In a further example, the center frequency fsc of a subcarrier adjacent fc, such as optical subcarrier SC2 in FIG. 16c, may satisfy the following equation:

$$fsc = fc + G/2 + (1+\alpha)*fb/2$$

where fb=baud rate of a subcarrier
α=roll-off factor of a Nyquist filter (e.g., root of raised cosine filter)
G=Guard band or spectral spacing between adjacent subcarriers.

Center frequencies of other subcarriers may be determined based on equations similar to that noted above. In generating subcarriers, the center frequencies may be quantized by the resolution of the FFT. Put another way, if a relatively large number of frequency bins are employed, more frequencies and a higher frequency resolution will be associated with such bins, whereas fewer bins results in fewer frequencies and less frequency resolution being associated with such bins.

Further, as noted above, primary node transmitter 202 may have a similar construction as primary node transmitter 304. In one example, transmitter 202 includes Tx D/A and Optics block similar to block 901 described above, as well as a digital signal processor similar Tx DSP 902. It is understood that the connections between and the operation of the DSP and Tx D/A Optics block in primary node 110 is similar to the connections to the connections between and the operation of Tx DSP 902 and Tx D/A Optics block 901 in secondary node 112.

In a further example, receiver 204 includes an Rx A/D and Optics block similar to block 1100 described above, as well as a digital signal processor similar Rx DSP 1150. It is understood that the connections between and the operation of the DSP and Rx A/D Optics block in primary node 110 is similar to the connections between and the operation of Tx DSP 902 and Tx D/A Optics block 901 in secondary node 112.

Other embodiments will be apparent to those skilled in the art from consideration of the specification. It is intended that the specification and examples be considered as exemplary only, with a true scope and spirit of the invention being indicated by the following claims.

What is claimed is:

1. An apparatus, comprising:
   a receiver being operable to receive a first modulated optical signal, the first modulated optical signal including a plurality of optical subcarriers, a first laser being operable to supply light to a modulator that modulates the light to provide the plurality of optical subcarriers;
   a transmitter being operable to output a second modulated optical signal;
   a second laser being operable to supply an optical signal, such that the receiver is operable to receive a first portion of the optical signal and the transmitter is operable to receive a second portion of the optical signal, a frequency of the optical signal supplied by the second laser is indicative of a frequency of one or more of the plurality of optical subcarriers.

2. An apparatus in accordance with claim 1, further including an optical splitter that is operable to receive the optical signal supplied from the second laser and supply the first portion of the optical signal to the receiver portion and supply the second portion of the optical signal to the transmitter portion.

3. An apparatus in accordance with claim 1, further including a polarization beam splitter that receives the first modulated optical signal and supplies a first output having a first polarization and a second output having a second polarization.

4. An apparatus in accordance with claim 3, further including an optical hybrid circuit that is operable to receive the first output and second output from the polarization beam splitter, the optical hybrid circuit also being operable to receive the first portion of the optical signal supplied from the second laser, the optical hybrid circuit supplying a plurality of mixing products.

5. An apparatus in accordance with claim 3, further including a detector circuit including a plurality of photodiodes, the detector circuit being operable to generate electrical signals based on a plurality of mixing products output form the optical hybrid circuit.

6. An apparatus in accordance with claim 3, further including a digital signal processor operable to generate a signal indicative of the frequency associated with the second modulated optical signal.

7. An apparatus in accordance with claim 6, further including a control circuit that provides a control signal based on the signal indicative of the frequency associated with the second modulated optical signal.

8. An apparatus in accordance with claim 7, wherein the control circuit includes a heater thermally coupled to the second laser, a temperature of the heater being based on the control signal.

9. An apparatus in accordance with claim 7, wherein a current applied to the second laser is controlled based on the control signal.

10. An apparatus in accordance with claim 7, further including a tap that provides a first part of the optical signal supplied by the second laser to the splitter and a second part of the optical signal supplied by the second laser to a wavelength locker circuit, the wavelength locker circuit providing a signal to the microprocessor based on the second part of the optical signal.

11. An apparatus in accordance with claim 7, wherein the receiver includes a plurality of memories, the control circuit is operable to provide the control signal based on values stored in the plurality of memories.

12. An apparatus in accordance with claim 11, wherein the values are indicative of frequencies of the plurality of optical subcarriers included in the first modulated optical signal.

13. An apparatus in accordance with claim 11, wherein each of the plurality of memories includes a frequency bin.

14. An apparatus in accordance with claim 7, wherein the receiver includes a carrier recovery circuit, which supplies the signal indicative of the frequency associated with the second modulated optical signal.

15. An apparatus in accordance with claim 1, wherein the frequency of the first modulated optical signal is equal to the frequency of the second modulated optical signal.

16. An apparatus in accordance with claim 1, wherein each of the plurality of optical subcarriers includes a Nyquist subcarrier.

17. An apparatus in accordance with claim 1, wherein the plurality of optical subcarriers is a plurality of first optical subcarriers, the second modulated optical signal includes a second optical subcarrier.

18. An apparatus in accordance with claim 17, wherein the second optical subcarrier is a Nyquist subcarrier.

19. An apparatus in accordance with claim 1, wherein the second laser is a distributed feedback (DFB) laser.

\* \* \* \* \*